United States Patent
Matsuda et al.

(10) Patent No.: US 6,306,976 B1
(45) Date of Patent: *Oct. 23, 2001

(54) RUBBERY POLYMER AND METHOD FOR PRODUCING THE SAME

(75) Inventors: Takaaki Matsuda; Hideki Yamasaki, both of Ooita (JP)

(73) Assignee: Japan Elastomer Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/969,746

(22) Filed: Nov. 13, 1997

(30) Foreign Application Priority Data

Dec. 3, 1996 (JP) ................................ 8-336275

(51) Int. Cl.$^7$ .................. C08F 255/06; C08F 279/00; C08F 293/00; C08F 295/00
(52) U.S. Cl. ................ 525/316; 525/250; 525/271; 525/314; 525/315; 526/173; 526/183; 526/335; 526/336; 526/337; 526/340
(58) Field of Search .................... 525/250, 271, 525/314, 316, 315; 526/173, 183, 335, 336, 337, 340

(56) References Cited

U.S. PATENT DOCUMENTS

| 4,600,749 | * | 7/1986 | Minekawa et al. | 525/314 |
|---|---|---|---|---|
| 5,306,778 | * | 4/1994 | Ishida et al. | 525/310 |
| 5,554,696 | * | 9/1996 | Fayt et al. | 525/314 |
| 5,773,521 | * | 6/1998 | Hoxmeier et al. | 525/316 |

FOREIGN PATENT DOCUMENTS

| 5919577 | 5/1984 | (JP) . |
|---|---|---|
| 5919578 | 5/1984 | (JP) . |
| 2132112 | 5/1990 | (JP) . |

* cited by examiner

*Primary Examiner*—Patrick D. Niland
(74) *Attorney, Agent, or Firm*—Birch, Stewart, Kolasch & Birch, LLP

(57) ABSTRACT

Disclosed is a rubbery polymer comprising a conjugated diene polymer, and bonded thereto, a lithium-detached residue of a lithium-containing organic polymer used as a catalyst in the production of the conjugated diene polymer, wherein the lithium-containing organic polymer is obtained by reacting an organolithium compound with a first polymerizable material comprising at least one conjugated diene monomer and a second polymerizable material comprising at least one aromatic vinyl compound, which second polymerizable material contains at least one multi-vinyl aromatic compound having at least two vinyl groups, and wherein the lithium-containing organic polymer has a specific narrow molecular weight distribution. The rubbery polymer of the present invention is commercially advantageous in that, by using it as a reinforcing agent for a styrene polymer resin, there can be obtained a high impact styrene polymer resin composition which is useful for producing shaped articles having an excellent balance of impact resistance and appearance (luster).

18 Claims, 1 Drawing Sheet

RUBBERY POLYMER AND METHOD FOR PRODUCING THE SAME

BACKGROUND OF THE INVENTION

1. Field of the Invention

The present invention relates to a rubbery polymer and a method for producing the same. More particularly, the present invention is concerned with a rubbery polymer comprising a conjugated diene polymer and, bonded thereto, a lithium-detached residue of a lithium-containing organic polymer used as a catalyst (hereinafter, frequently referred to simply as an "organolithium catalyst") in the production of the conjugated diene polymer, wherein the lithium-containing organic polymer is obtained by reacting an organolithium compound with a first polymerizable material comprising at least one conjugated diene monomer and a second polymerizable material comprising at least one aromatic vinyl compound, which second polymerizable material contains at least one multi-vinyl aromatic compound having at least two vinyl groups, and wherein the lithium-containing organic polymer has a specific narrow molecular weight distribution. The present invention is also concerned with a method for producing the above rubbery polymer, which comprises polymerizing at least one conjugated diene monomer in the presence of a specific lithium-containing organic polymer as a catalyst. The rubbery polymer of the present invention is advantageous in that, by using it as a reinforcing agent for a styrene polymer resin, there can be obtained a high impact styrene polymer resin composition which is useful for producing a shaped article having an excellent balance of impact resistance and appearance (luster). Examples of shaped articles which can be produced from this high impact styrene polymer resin composition include housings and other parts for household electric appliances, automobile parts, parts for office equipment, general sundry goods, footgear, toys and various industrial materials. The rubbery polymer of the present invention is also advantageous in that it is useful as an asphalt modifying agent for improving the properties of an asphalt to be used in, for example, road paving, production of a waterproof sheet and roofing.

2. Prior Art

Styrene polymers have not only excellent rigidity, excellent transparency and excellent luster, but also good moldability. Therefore, styrene polymers are widely used in various application fields. However, styrene polymers have a large defect in that it has poor impact resistance. In order to remove this defect, it has been attempted to use various types of unvulcanized rubbers as reinforcing agents for improving the impact resistance of styrene polymers. Thus, various types of rubber-reinforced styrene polymers have been proposed. Among such various rubber-reinforced styrene polymers, commercially widely produced are high impact styrene polymer resin compositions comprising a rubber-modified styrene polymer resin obtained by a method in which at least one vinyl aromatic monomer is subjected to radical polymerization in the presence of an unvulcanized rubbery polymer, to thereby obtain a rubbery polymer having a styrene polymer grafted thereon.

As representative examples of such rubbery polymers usable as a reinforcing agent for improving the impact resistance of styrene polymers, there can be mentioned polybutadiene and a styrene-butadiene copolymer. Of them, polybutadiene is widely used since it can impart especially excellent impact resistance to styrene polymers.

Generally, such polybutadiene and a styrene-butadiene copolymer have been produced by a method in which, as a polymerization catalyst, use is made of an organomonolithium compound, such as n-butyllithium or sec-butyllithium.

However, there have also been reported production methods for rubbery polymers, in which, as a polymerization catalyst, use is made of a reaction product obtained by a process comprising reacting an organomonolithium compound with a multi-vinyl aromatic compound. Examples of such polymerization catalysts used for producing rubbery polymers include a reaction product obtained by reacting an organomonolithium compound with a multi-vinyl aromatic compound (Unexamined Japanese Patent Application Laid-Open Specification No. 48-103690), a reaction product obtained by a method in which an organomonolithium compound is reacted with a conjugated diene compound or a mono-vinyl aromatic compound, and the resultant is reacted with a multi-vinyl aromatic compound (West German Patent No. 2003384), and a reaction product obtained by a method in which an organomonolithium compound, a conjugated diene compound and a multi-vinyl aromatic compound are simultaneously reacted with one another (Examined Japanese Patent Application Publication Nos. 43-25510 and 51-44987). Each of the polymerization catalysts disclosed in the above patent documents has a broad molecular weight distribution. When such a catalyst having a broad molecular weight distribution is used in the production of a rubbery polymer and the obtained rubbery polymer is used in a high impact styrene polymer resin composition, a shaped article obtained using the resin composition is caused to have an unsatisfactory balance of impact strength and appearance.

In recent years, the above-mentioned high impact styrene polymer resin compositions have been used in a wide diversity of application fields, such as housings and other parts for household electric appliances, automobile parts, parts for office equipment, general sundry goods and toys. In accordance with this diversification of the application fields of the high impact styrene polymer resin compositions, these compositions have been required to be increasingly improved with respect to various properties, and it is especially strongly desired that the high impact styrene polymer resin compositions exhibit a good balance of impact resistance and appearance.

Generally, a high impact styrene polymer resin composition is produced by a method in which a rubbery polymer comprising a conjugated diene polymer (such as polybutadiene or a styrene-butadiene copolymer) is dissolved in a styrene monomer, and the resultant mixture is subjected to bulk polymerization or bulk-suspension polymerization while stirring.

In general, the impact resistance of a high impact styrene polymer resin composition, containing a rubbery polymer, can be improved by increasing the rubbery polymer content thereof. However, when the rubbery polymer content of a high impact styrene polymer resin composition is increased, the luster of a shaped article produced from the resin composition becomes poor. The luster of such shaped article can be improved by decreasing either the rubbery polymer content of the resin composition or the particle diameter of the rubbery polymer; however, in either case, the impact resistance of the resin composition becomes markedly low.

Thus, with respect to high impact styrene polymer resin compositions containing a rubbery polymer, there has been a technical dilemma in that impact resistance and luster cannot be simultaneously improved. In other words, there has not been a high impact styrene polymer resin composition having a good balance of impact resistance and luster.

For solving the above problem, various methods have been proposed for producing a high impact styrene polymer resin composition having a good balance of impact resistance and luster. Examples of such proposed methods include a method in which use is made of a rubbery polymer comprising a conjugated diene polymer having a specific solution viscosity (Examined Japanese Patent Application Publication No. 58-4934), a method in which use is made of a rubbery polymer comprising a conjugated diene polymer wherein the solution viscosity and the Mooney viscosity satisfy a specific relationship (Examined Japanese Patent Application Publication No. 53-44188), and a method in which use is made of not only a rubbery polymer comprising a conjugated diene polymer having a specific solution viscosity but also a cross-linked polymer produced using an organic peroxide wherein the tensile modulus and the degree of swelling of the cross-linked product satisfy a specific relationship (Unexamined Japanese Patent Application Laid-Open Specification No. 60-25001). The high impact styrene polymer resin compositions produced by using these methods have an improved balance of impact resistance and luster, as compared to that of a high impact styrene polymer resin composition containing polybutadiene as the rubbery polymer. However, the improvement in the balance of impact resistance and luster, achieved by these methods, is frequently unsatisfactory.

Unexamined Japanese Patent Application Laid-Open Specification Nos. 61-143415, 63-165413, 2-132112 and 2-208312 disclose methods for improving the impact resistance and appearance characteristics of a high impact styrene polymer resin composition, which methods employ, as a rubbery polymer, a styrene-butadiene block copolymer having a specific block configuration. However, it has been found that these methods are unable to provide a practically satisfactory balance of impact resistance and appearance.

As another type of a high impact styrene polymer resin composition, there is known a rubber-modified styrene-acrylonitrile copolymer, that is, the so-called ABS resin. Generally, an ABS resin is produced by a method in which styrene and acrylonitrile are grafted by emulsion polymerization on a polybutadiene rubber latex having a desired particle diameter and a desired cross-linking degree. ABS resins are advantageous in that they are excellent in luster, impact resistance and rigidity. However, an emulsion polymerization, which is used for producing an ABS resin, requires not only cumbersome operations but also a large amount of energy, so that an emulsion polymerization is economically disadvantageous. In addition, since an emulsion polymerization produces waste water, equipment for treating the waste water is required.

Further, it has recently been proposed to produce an ABS resin not by an emulsion polymerization, but by a non-emulsion polymerization selected from a bulk polymerization, a bulk-suspension polymerization and a solution polymerization. Specifically, in this method, a rubbery polymer is dissolved in a mixture of styrene and acrylonitrile and the resultant mixture is subjected to a bulk polymerization, or a bulk-suspension polymerization or a solution polymerization. This method is attracting attention since it has advantages not only in that the content of impurities in the obtained ABS is small and, hence, the ABS is less likely to suffer discoloration, but also in that there is no need for waste water treatment, thus providing an economic advantage over the emulsion polymerization method. However, an ABS resin produced by a non-emulsion polymerization has disadvantages in that not only is the particle diameter of the dispersed rubber particles large, but also the grafting of the styrene and acrylonitrile on the rubbery polymer becomes unsatisfactory, so that the obtained ABS resin has not only poor impact resistance but also poor luster.

In order to solve the above-mentioned problem of the ABS resin produced by the non-emulsion polymerization method, there have been proposed improved non-emulsion polymerization methods for producing an ABS resin. Examples of such improved methods include a method in which use is made of a rubbery polymer having a low solution viscosity (Unexamined Japanese Patent Application Laid-Open Specification Nos. 63-199717 and 63-207803), and a method in which use is made of a rubbery polymer comprising a specific styrene-butadiene block copolymer (Unexamined Japanese Patent Application Laid-Open Specification No. 2-185509). However, these non-emulsion polymerization methods are unable to provide an ABS resin having a satisfactory balance of impact resistance and luster.

As apparent from the foregoing, a satisfactory high impact styrene polymer resin composition having a good balance of impact resistance and luster has not been produced by using a rubbery polymer, such as polybutadiene or a styrene-butadiene copolymer, which is produced by using a conventional anionic polymerization catalyst.

The primary task of the present invention is to solve the above problem of the prior art, that is, to provide an excellent rubbery polymer which can be advantageously used for the production of a high impact styrene polymer resin composition having an excellent balance of impact resistance and luster.

SUMMARY OF THE INVENTION

In this situation, the present inventors have made extensive and intensive studies toward developing a rubbery polymer which can be used to produce a high impact styrene polymer resin composition which, when processed into a shaped article, exhibits an excellent balance of impact resistance and luster. As a result, it has unexpectedly been found that when, in the production of a high impact styrene polymer resin composition, use is made of a specific rubbery polymer as a reinforcing agent which comprises a conjugated diene polymer and, bonded thereto, a lithium-detached residue of a lithium-containing organic polymer used as a catalyst in the production of the conjugated diene polymer, wherein the lithium-containing organic polymer is obtained by reacting an organolithium compound with a first polymerizable material comprising at least one conjugated diene monomer and a second polymerizable material comprising at least one aromatic vinyl compound, which second polymerizable material contains at least one multi-vinyl aromatic compound having at least two vinyl groups, and wherein the lithium-containing organic polymer has a narrow specific molecular weight distribution, it becomes possible to obtain a high impact styrene polymer resin composition which is useful for producing a shaped article having an excellent balance of impact resistance and appearance (luster). The present invention has been completed, based on this novel finding.

Accordingly, it is a primary object of the present invention to provide a rubbery polymer which can be advantageously used for producing a high impact styrene polymer resin composition having an excellent balance of impact strength and appearance.

Another object of the present invention is to provide a catalyst which can be advantageously used for producing the above excellent rubbery polymer.

Still another object of the present invention is to provide an advantageous method for producing the above rubbery polymer, in which the above catalyst is used.

Still another object of the present invention is to provide a high impact styrene polymer resin composition produced using the above rubbery polymer.

The foregoing and other object of the present invention will be apparent from the following detailed description and claims taken in connection with the accompanying drawing.

DETAILED DESCRIPTION OF THE INVENTION

Figure 1:
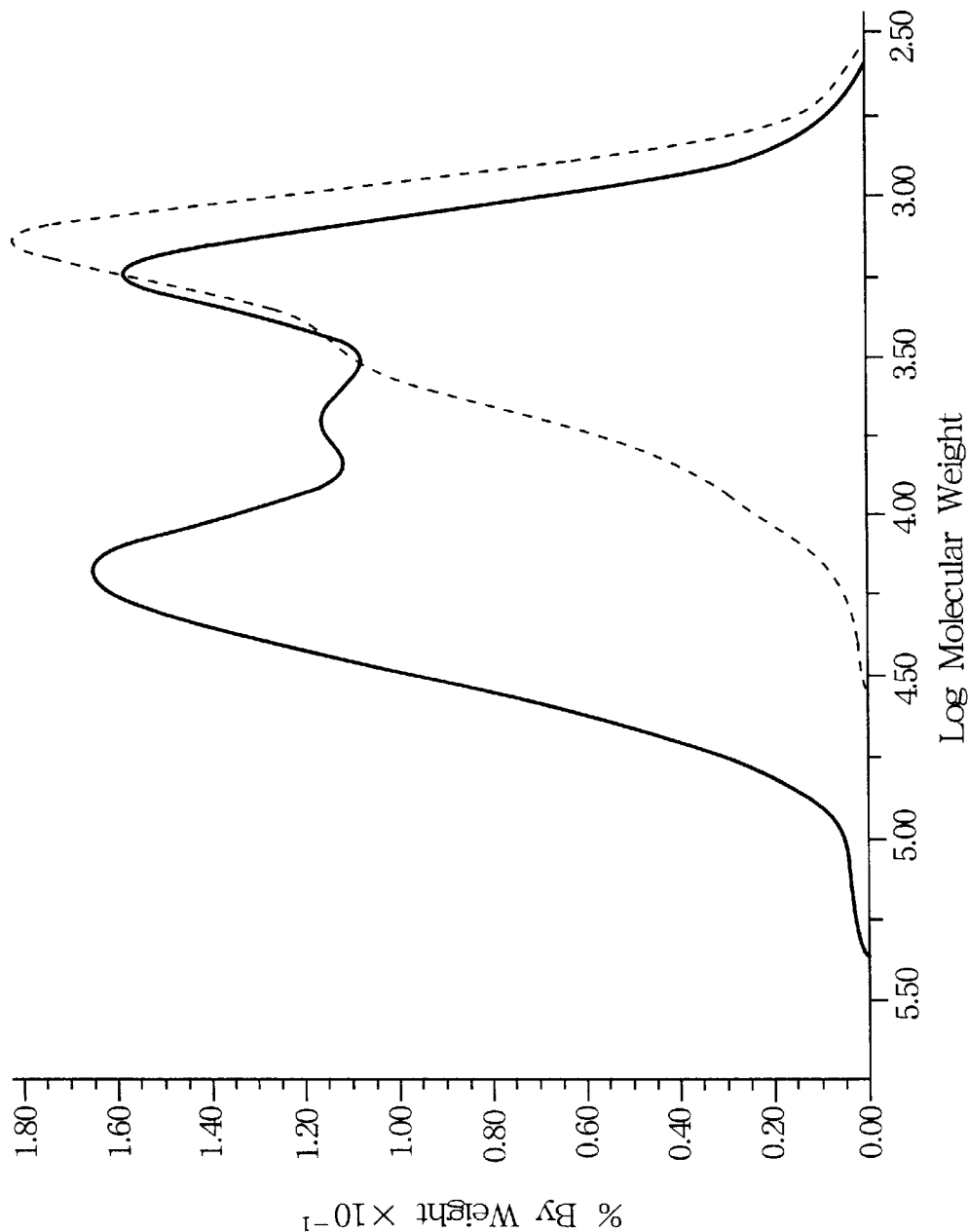
FIG. 1 is a graph showing a gel permeation chromatogram of the organolithium catalyst obtained in Example 8 (indicated by the broken line) and a gel permeation chromatogram of the organolithium catalyst obtained in Comparative Example 3 (indicated by the solid line).

In a primary aspect of the present invention, there is provided a rubbery polymer comprising:

(A) a conjugated diene polymer and, bonded thereto, (B) a lithium-detached residue of a lithium-containing organic polymer used as a catalyst in the production of the conjugated diene polymer, the residue comprising a polymer chain comprising monomer units (a) derived from at least one conjugated diene monomer and monomer units (b) derived from at least one aromatic vinyl compound, the monomer units (b) including monomer units derived from at least one multi-vinyl aromatic compound, wherein the lithium-containing organic polymer is obtained by reacting an organolithium compound with a first polymerizable material comprising at least one conjugated diene monomer and a second polymerizable material comprising at least one aromatic vinyl compound, the second polymerizable material containing at least one multi-vinyl aromatic compound having at least two vinyl groups, and wherein the lithium-containing organic polymer has an $\overline{Mw}/\overline{Mn}$ ratio of from 1.2 to 3.5 wherein $\overline{Mw}$ represents the weight average molecular weight of the lithium-containing organic polymer and $\overline{Mn}$ represents the number average molecular weight of the lithium-containing organic polymer.

For easy understanding of the present invention, the essential features and various embodiments of the present invention are enumerated below.

1. A rubbery polymer comprising:

(A) a conjugated diene polymer and, bonded thereto, (B) a lithium-detached residue of a lithium-containing organic polymer used as a catalyst in the production of the conjugated diene polymer, the residue comprising a polymer chain comprising monomer units (a) derived from at least one conjugated diene monomer and monomer units (b) derived from at least one aromatic vinyl compound, the monomer units (b) including monomer units derived from at least one multi-vinyl aromatic compound, wherein the lithium-containing organic polymer is obtained by reacting an organolithium compound with a first polymerizable material comprising at least one conjugated diene monomer and a second polymerizable material comprising at least one aromatic vinyl compound, the second polymerizable material containing at least one multi-vinyl aromatic compound having at least two vinyl groups, and wherein the lithium-containing organic polymer has an $\overline{Mw}/\overline{Mn}$ ratio of from 1.2 to 3.5 wherein $\overline{Mw}$ represents the weight average molecular weight of the lithium-containing organic polymer and $\overline{Mn}$ represents the number average molecular weight of the lithium-containing organic polymer.

2. The rubbery polymer according to item 1 above, wherein the content of the monomer units derived from at least one multi-vinyl aromatic compound in the lithium-containing organic polymer is from 2 to 40% by weight, and the weight average molecular weight of the lithium-containing organic polymer is from 500 to 20,000.

3. The rubbery polymer according to item 1 or 2 above, wherein the conjugated diene polymer (A) comprises (a') monomer units derived from at least one conjugated diene monomer.

4. The rubbery polymer according to item 3 above, wherein the conjugated diene polymer (A) is comprised solely of the monomer units (a').

5. The rubbery polymer according to item 1 or 2 above, wherein the conjugated diene polymer (A) comprises (a') monomer units derived from at least one conjugated diene monomer and (b') monomer units derived from at least one aromatic vinyl compound.

6. The rubbery polymer according to item 5 above, wherein the conjugated diene polymer is a random copolymer comprised of the monomer units (a') and the monomer units (b').

7. The rubbery polymer according to item 6 above, wherein the total amount of the monomer units (b) in the lithium-detached residue (B) and the monomer units (b') in the conjugated diene polymer (A) is 50% by weight or less, based on the weight of the rubbery polymer.

8. The rubbery polymer according to item 5 above, wherein the conjugated diene polymer (A) is a block copolymer having a polymer block containing a first polymeric moiety comprised solely of the monomer units (b').

9. The rubbery polymer according to item 8 above, wherein the total amount of the monomer units (b) in the lithium-detached residue (B) and the monomer units (b') in the conjugated diene polymer (A) is 50% by weight or less, based on the weight of the rubbery polymer, and wherein the amount of the monomer units (b') of the first polymeric moiety is less than 10% by weight, based on the total weight of the monomer units (b) in the lithium-detached residue (B) and the monomer units (b') in the conjugated diene polymer (A).

10. The rubbery polymer according to item 9 above, which further comprises a second polymeric moiety comprised solely of the monomer units (b) in the lithium-detached residue (B), and wherein the total amount of the monomer units (b') of the first polymeric moiety and the monomer units (b) of the second polymeric moiety is 10% by weight or less, based on the total weight of the monomer units (b) in the lithium-detached residue (B) and the monomer units (b') in the conjugated diene polymer (A).

11. The rubbery polymer according to any one of items 4, 7, 9 and 10 above, which has the following properties:

(1) 100,000 to 650,000 in terms of the weight average molecular weight, (2) 1.1 to 3.0 in terms of the ratio of the weight average molecular weight to the number average molecular weight, and (3) 20% by weight or less in terms of the content of a moiety of the rubbery polymer which has a molecular weight two or more times a weight average molecular weight corresponding to the peak top of the chromatogram of the rubbery polymer.

12. The rubbery polymer according to item 8 above, which has the following properties:
    (1) 100,000 to 600,000 in terms of the weight average molecular weight,
    (2) 3 to 50% by weight in terms of the total content of the monomer units (b) and the monomer units (b'),
    (3) 10% by weight or more based on the total weight of the monomer units (b) in the lithium-detached residue (B) and the monomer units (b') in the conjugated diene polymer (A), in terms of the amount of the monomer units (b') of the first polymeric moiety,
    (4) 1.1 to 3.0 in terms of the ratio of the weight average molecular weight to the number average molecular weight, and
    (5) 20% by weight or less in terms of the content of a moiety of the rubbery polymer which has a molecular weight two or more times a weight average molecular weight corresponding to the peak top of the chromatogram of the rubbery polymer.
13. The rubbery polymer according to item 12 above, which further comprises a second polymeric moiety comprised solely of the monomer units (b) in the lithium-detached residue (B), and wherein the total amount of the monomer units (b') of the first polymeric moiety and the monomer units (b) of the second polymeric moiety is more than 10% by weight, based on the total weight of the monomer units (b) in the lithium-detached residue (B) and the monomer units (b') in the conjugated diene polymer (A).
14. A catalyst comprising a lithium-containing organic polymer which is obtained by reacting an organolithium compound with a first polymerizable material comprising at least one conjugated diene monomer and a second polymerizable material comprising at least one aromatic vinyl compound, the second polymerizable material containing at least one multi-vinyl aromatic compound having at least two vinyl groups,
    wherein the lithium-containing organic polymer has an $\overline{Mw}/\overline{Mn}$ ratio of from 1.2 to 3.5, wherein $\overline{Mw}$ represents the weight average molecular weight of the lithium-containing organic polymer and $\overline{Mn}$ represents the number average molecular weight of the lithium-containing organic polymer.
15. The catalyst according to item 14 above, wherein the content of the at least one multi-vinyl aromatic compound in the lithium-containing organic polymer is from 2 to 40% by weight, and the weight average molecular weight of the lithium-containing organic polymer is from 500 to 20,000.
16. A method for producing a rubbery polymer, which comprises polymerizing at least one conjugated diene monomer in the presence of a catalyst in a hydrocarbon solvent,
    the catalyst comprising a lithium-containing organic polymer obtained by reacting an organolithium compound with a first polymerizable material comprising at least one conjugated diene monomer and a second polymerizable material comprising at least one aromatic vinyl compound, the second polymerizable material containing at least one multi-vinyl aromatic compound having at least two vinyl groups, wherein the lithium-containing organic polymer has an $\overline{Mw}/\overline{Mn}$ ratio of from 1.2 to 3.5, wherein $\overline{Mw}$ represents the weight average molecular weight of the lithium-containing organic polymer and $\overline{Mn}$ represents the number average molecular weight of the lithium-containing organic polymer,
    the rubbery polymer comprising a conjugated diene polymer having bonded thereto a lithium-detached residue of the lithium-containing organic polymer.
17. The method according to item 16 above, wherein the at least one conjugated diene monomer is polymerized together with at least one aromatic vinyl compound.
18. A high impact styrene polymer resin composition which is substantially the same as that obtained by a method comprising subjecting to polymerization:
    (i) the rubbery polymer of any one of items 1 to 13 above, and
    (ii) a copolymerizable material selected from the group consisting of at least one aromatic vinyl compound and a mixture of at least one aromatic vinyl compound and at least one comonomer copolymerizable with the at least one aromatic vinyl compound,
        wherein the polymerization is selected from the group consisting of a bulk polymerization, a bulk-suspension polymerization and a solution polymerization.
19. The resin composition according to item 18 above, wherein the copolymerizable material is a mixture of at least one aromatic vinyl compound and at least one unsaturated nitrile monomer.
20. The resin composition according to item 18 above, wherein the copolymerizable material is a mixture of at least one aromatic vinyl compound and at least one monomer selected from the group consisting of an acrylic ester monomer and a methacrylic ester monomer.

Hereinbelow, the present invention is described in detail.

The rubbery polymer of the present invention comprises: (A) a conjugated diene polymer and, bonded thereto, (B) a lithium-detached residue of a specific organolithium catalyst comprising a lithium-containing organic polymer which residue comprises a polymer chain comprising monomer units (a) derived from at least one conjugated diene monomer and monomer units (b) derived from at least one aromatic vinyl compound, which monomer units (b) includes monomer units derived from at least one multi-vinyl aromatic compound, wherein the lithium-containing organic polymer has an $\overline{Mw}/\overline{Mn}$ ratio of from 1.2 to 3.5 wherein $\overline{Mw}$ represents the weight average molecular weight of the lithium-containing organic polymer and $\overline{Mn}$ represents the number average molecular weight of the lithium-containing organic polymer.

The above-mentioned specific organolithium catalyst is obtained by reacting an organolithium compound with a first polymerizable material comprising at least one conjugated diene monomer and a second polymerizable material comprising at least one aromatic vinyl compound, which second polymerizable material contains at least one multi-vinyl aromatic compound having at least two vinyl groups.

Specific examples of methods for producing the organolithium catalyst include the following 3 methods:
    method 1 which comprises reacting at least one conjugated diene monomer (as the first polymerizable material) and at least one multi-vinyl aromatic compound (as the second polymerizable material) in a hydrocarbon solvent in the presence of an organolithium compound;
    method 2 which comprises reacting at least one conjugated diene monomer (as the first polymerizable material) and at least one multi-vinyl aromatic compound (as the second polymerizable material) in a hydrocarbon solvent in the presence of an organolithium compound, and adding to the resultant reaction mixture a further conjugated diene monomer continuously or in a portionwise manner (the amount of the further conjugated diene monomer is generally 1 to 99% by weight, preferably 20 to 90% by weight, based on the total weight of the conjugated diene monomers used in this method) wherein a further reaction is performed; and method 3 which comprises reacting at least one conjugated diene monomer (as the first polymerizable material) and at least one multi-vinyl aromatic compound (as the second polymerizable material) in a polar compound-containing hydrocarbon solvent in the presence of an organolithium compound, and adding to the resultant reaction mixture a further conjugated diene monomer continuously or in a portionwise manner (the amount of the further conjugated diene monomer is generally 1 to 99% by weight, preferably 20 to 90% by weight, based on the total weight of the conjugated diene monomers used in this method) wherein a further reaction is performed.

Examples of hydrocarbon solvents usable in the production of the above-mentioned organolithium catalyst include aliphatic hydrocarbons, such as butane, pentane and hexane; alicyclic hydrocarbons, such as cyclopentane and cyclohexane; and aromatic hydrocarbons, such as benzene, toluene, xylene, ehtylbenzene and diethylbenzene. These solvents can be used individually or in combination. Of the above-mentioned solvents, hexane and cyclohexane are preferred.

Examples of polar compounds added to the hydrocarbon solvent include tertiary monoamines, tertiary diamines, chain ethers and cyclic ethers. Examples of tertiary monoamines include trimethylamine, triethylamine, methyldiethylamine, 1,1-dimethoxyamine, 1,1-diethoxytrimethylamine, 1,1-diethoxytriethylamine, N,N-dimethylformamidediisopropylacetal, N-dimethylformamide, and N,N-dimethylformamidedicylohexylacetalN. Examples of tertiary diamines include N, N,N',N'-tetramethyldiaminomethane, N,N,N',N'-tetramethylethylenediamine, N,N,N',N'-tetramethylpropanediamine, N,N,N',N'-tetramethyldiaminobutane, N,N,N',N'-tetramethyldiaminopentane, N,N,N',N'-tetramethylhexanediamine, dipiperidinopentane and dipiperidinoethane. Examples of chain ethers include dimethyl ether, diethyl ether, ethylene glycol dimethyl ether, diethylene glycol dimethyl ether, triethylene glycol dimethyl ether and tetraethylene dimethyl ether. Examples of cyclic ethers include tetrahydrofuran, bis(oxolanyl)ethane, 2,2-bis(2-oxolanyl)propane, 1,1-bis(2-oxolanyl)ethane, 2,2-bis(2-oxolanyl)butane, 2,2-bis(5-methyl-2-oxolanyl)propane and 2,2-bis(3,4,5-trimethyl-2-oxolanyl)propane. Of these polar compounds, N,N,N',N'-tetramethylethylenediamine (a tertiary diamine) and tetrahydrofuran (a cyclic ether) are preferred. These polar compounds can be used individually or in combination.

With respect to the amount of the polar compound, the polar compound is generally used in an amount of from 30 to 50,000 ppm, preferably from 200 to 20,000 ppm, based on the amount of the hydrocarbon solvent used in the production of the organolithium catalyst. When the amount of the polar compound is less than 30 ppm, disadvantages are likely caused such that the molecular weight distribution of the organolithium catalyst becomes disadvantageously broad. Therefore, when a rubbery polymer obtained using such an organolithium catalyst having a broad molecular weight distribution is used for producing a high impact styrene polymer resin composition, the obtained high impact styrene polymer resin composition is caused to have a poor balance of gloss and impact resistance. When the amount of the polar compound exceeds 50,000 ppm, disadvantages are likely to be caused such that, even when it is intended to recycle the solvent after the polymerization, it is difficult to separate the solvent from the polar compound.

Examples of conjugated diene monomers usable as the first polymerizable material include 1,3-butadiene, isoprene, 2,3-dimethyl-1,3-butadiene, 1,3-pentadiene, 3-methyl-1,3-pentadiene, 1,3-heptadiene and 1,3-hexadiene. These conjugated diene monomers can be used individually or in combination. Of the above-mentioned conjugated diene monomers, 1,3-butadiene and isoprene are preferred.

With respect to the amount of the conjugated diene monomer as the first polymerizable material, there is no particular limitation; however, it is preferred to use the conjugated diene monomer in an amount of from 3 to 100 moles per mole of the organolithium compound.

In the present invention, the first polymerizable material may further comprise a comonomer copolymerizable with the conjugated diene monomer. As an example of such a comonomer, there can be mentioned a monovinyl aromatic compound. Examples of mono-vinyl aromatic compounds include styrene, p-methylstyrene, α-methylstyrene, 3,5-dimethylstyrene, vinylethylbenzene, vinylxylene, vinylnaphthalene and diphenylethylene. These monomers can be used individually or in combination. With respect to the weight ratio of the conjugated diene monomer to the monovinyl aromatic compound, the weight ratio is generally in the range of from 100:0 to 10:90, preferably from 100:0 to 50:50.

Examples of organolithium compounds usable in the production of the organolithium catalyst include organic monolithium compounds, such as n-butyllithium, secbutyllithium, tert-butyllithium, n-propyllithium, isopropyllithium and benzyllithium. Of these organic monolithium compounds, n-butyllithium and sec-butyllithium are preferred.

In the present invention, it is necessary that the second polymerizable material contain at least one multi-vinyl compound having at least two vinyl groups. Examples of multi-vinyl aromatic compounds usable as the second polymerizable material include divinyl aromatic compounds, such as o-, m- and p-divinylbenzenes, o-, m- and p-diisopropenylbenzenes, 1,2-divinyl-3,4-dimethylbenzene, 1,3-divinylnaphthalene, 2,4-divinylbiphenyl and 1,2-divinyl-3,4-dimethylbenzene; and trivinyl aromatic compounds, such as 1,2,4-trivinylbenzene, 1,3,5-trivinylnaphthalene, 3,5,4'-trivinylbiphenyl and 1,5,6-trivinyl-3,7-diethylnaphthalene. These compounds can be used individually or in combination. Of the above-mentioned multi-vinyl aromatic compounds, divinylbenzene and diisopropenylbenzene are preferred. Each of divinylbenzene and diisopropenylbenzene has o-, m- and p-isomers. Each of divinylbenzene and diisopropenylbenzene may be used in the form of a mixture of the above-mentioned isomers.

With respect to the second polymerizable material other than the multi-vinyl aromatic compound, it is preferred to use monovinyl aromatic compounds which are copolymerizble with the multi-vinyl aromatic compound. Examples of mono-vinyl aromatic compounds copolymerizable with the multi-vinyl aromatic compound include styrene, p-methylstyrene, α-methylstyrene, 3,5-di-methylstyrene, vinylethylbenzene, vinylxylene, vinylnaphthalene and diphenylethylene. These compounds can be used individually or in combination. With respect to the weight ratio of the multi-vinyl aromatic compound to the mono-vinyl aromatic compound, the weight ratio is generally in the range of from 100:0 to 10:90, preferably from 100:0 to 50:50.

In the production of the organolithium catalyst, it is preferred that the multi-vinyl aromatic compound and the organolithium compound are used in respective amounts such that the molar ratio of the multi-vinyl aromatic compound to the organolithium compound is in the range of from 0.1 to 2.0, more preferably from 0.15 to 1.5, still more preferably from 0.2 to 1.0. When an organolithium catalyst produced using the molar ratio of less than 0.1 is used to obtain a rubbery polymer and the obtained rubbery polymer is used in a high impact styrene polymer resin composition, disadvantages are likely to be caused such that the resin composition is caused to have a poor balance of impact strength and luster. When an organolithium catalyst is produced using the molar ratio exceeding 2.0, disadvantages are likely to be caused such that the specific narrow molecular weight distribution of the lithium-containing organic polymer as defined in the present invention cannot be achieved, and that the obtained organolithium catalyst contains gel. Further, in this case, when a rubbery polymer obtained using the organolithium catalyst is used in a high impact styrene polymer resin composition, disadvantages are likely to be caused such that the resin composition contains large-sized rubbery polymer particles, so that the luster of the resin composition becomes poor.

In the rubbery polymer of the present invention, it is preferred that the content of the at least one multi-vinyl aromatic compound in the organolithium catalyst is from 2 to 40% by weight. When the content is less than 2% by weight, disadvantages are likely to be caused such that, when the rubbery polymer is used in a high impact styrene polymer resin composition, the resin composition has a poor balance of impact strength and luster. When the content exceeds 40% by weight, disadvantages are likely to be caused such that the specific narrow molecular weight distribution of the lithium-containing organic polymer as defined in the present invention cannot be achieved, and that the obtained organolithium catalyst contains gel. Further, in this case, when a rubbery polymer obtained using the organolithium catalyst is used in a high impact styrene polymer resin composition, disadvantages are likely to be caused such that the resin composition contains large-sized rubbery polymer particles, so that the luster of the resin composition becomes poor.

With respect to the reaction temperature in the production of the organolithium catalyst, the reaction temperature is generally in the range of from 10 to 140° C., more preferably from 35 to 110° C. The reaction time varies depending on the reaction temperature; however, the reaction time is generally in the range of from 5 minutes to 24 hours.

In the rubbery polymer of the present invention, it is preferred that the weight average molecular weight ($\overline{M}w$) of the organolithium catalyst (comprising the lithium-containing organic polymer) is in the range of from 500 to 20,000, more preferably from 1,000 to 10,000 as measured by gel permeation chromatography using a calibration curve obtained with respect to standard polystyrene samples. In the present invention, the $\overline{M}w$ and $\overline{M}n$ of the organolithium catalyst is as measured in a lithium-detached form thereof. Specifically, the measurements of the $\overline{M}w$ and $\overline{M}n$ can be conducted by, for example, a method in which the organolithium catalyst is reacted with a proton-donor, such as water, methanol or ethanol to thereby remove the lithium from the catalyst, and the resultant lithium-detached form of the catalyst is subjected to gel permeation chromatography.

When the $\overline{M}w$ of the lithium-containing organic polymer exceeds 20,000, disadvantages are likely to be caused such that, when the rubbery polymer is used in a high impact styrene polymer resin composition, the resin composition has a poor balance of impact strength and luster. When the $\overline{M}w$ of the organolithium catalyst is less than 500, disadvantages are likely to be caused such that the specific narrow molecular weight distribution as defined in the present invention cannot be achieved.

In the present invention, as mentioned above, it is necessary that the organolithium catalyst have an $\overline{M}w/\overline{M}n$ ratio of from 1.2 to 3.5, preferably from 1.2 to 2.5. When the $\overline{M}w/\overline{M}n$ ratio exceeds 3.5, disadvantages are caused such that, when the rubbery polymer is used in a high impact styrene polymer resin composition, the resin composition contains large-sized rubbery polymer particles, so that the luster of the resin composition becomes poor.

In the rubbery polymer of the present invention, it is preferred that the conjugated diene polymer (A) comprises (a') monomer units derived from at least one conjugated diene monomer and optionally (b') monomer units derived from at least one aromatic vinyl compound.

The rubbery polymer of the present invention can be produced by a method comprising polymerizing at least one conjugated diene monomer and optionally at least one aromatic vinyl compound in the presence of the above-mentioned organolithium catalyst in a hydrocarbon solvent.

Examples of conjugated diene monomers include 1,3-butadiene, isoprene, 2,3-dimethyl-1,3-butadiene, 1,3-pentadiene, 3-methyl-1,3-pentadiene, 1,3-heptadiene and 1,3-hexadiene. These monomers can be used individually or in combination. Of the above-mentioned conjugated diene monomers, 1,3-butadiene and isoprene are preferred.

Examples of aromatic vinyl compounds include styrene, p-methylstyrene, α-methylstyrene, vinylethylbenzene, vinylxylene, vinylnaphthalene and diphenylethylene. These monomers can be used individually or in combination. Of the above-mentioned aromatic vinyl compounds, styrene is especially preferred.

Examples of hydrocarbon solvents include aliphatic hydrocarbons, such as butane, pentane and hexane; alicyclic hydrocarbons, such as cyclopentane and cyclohexane; and aromatic hydrocarbons, such as benzene, toluene and xylene. These solvents can be used individually or in combination. Of the above-mentioned hydrocarbon solvents, hexane and cyclohexane are preferred.

With respect to the configuration of conjugated diene polymer (A) of the rubbery polymer of the present invention, there is no particular limitation, and conjugated diene polymer (A) may be:

(i) a polymer comprised solely of (a') monomer units derived from at least one conjugated diene monomer {hereinafter, frequently referred to simply as "conjugated diene polymer (i)"}, (ii) a polymer comprised of (a') monomer units derived from at least one conjugated diene monomer and (b') monomer units derived from at least one aromatic vinyl compound, which has a random configuration {hereinafter, frequently referred to simply as "conjugated diene-aromatic vinyl random copolymer (ii)"}, and (iii) a polymer comprised of (a') monomer units derived from at least one conjugated diene monomer and (b') monomer units derived from at least one aromatic vinyl compound, which contains at least one polymer block containing a first polymeric moiety comprised solely of monomer unit (b') {hereinafter, frequently referred to simply as "conjugated diene-aromatic vinyl block copolymer (iii)"}.

With respect to the rubbery polymer of the present invention which contains the above-mentioned conjugated diene-aromatic vinyl block copolymer (iii) as conjugated diene polymer (A), the rubbery polymer may further comprises a second polymeric moiety comprised solely of monomer units (b) in lithium-detached residue (B).

In the present invention, the term "polymeric moiety" means a moiety of the rubbery polymer, which does not undergo degradation when the rubbery polymer is subjected to oxidative degradation, and which generally contains an at least ten contiguous arrangement of monomer units derived from the aromatic vinyl compound. The degradation of the rubbery polymer can be conducted by, for example, a method in which the rubbery polymer is subjected to oxidative degradation by using tertbutylhydroperoxide in the presence of osmium tetraoxide as a catalyst {I. M. Kolthoff et al., J. Polym. Sci., 1, 4, 29 (1946)}. The determination of the polymeric moiety can be conducted by ultraviolet spectroscopy.

With respect to the rubbery polymer of the present invention which contains the above-mentioned conjugated diene polymer (i) as conjugated diene polymer (A), such a rubbery polymer can be produced by, for example, the following methods:

a method in which an organolithium catalyst is prepared by the above-mentioned reaction, and at least one conjugated diene monomer is added to the resultant reaction mixture containing the obtained organolithium catalyst to thereby perform a polymerization reaction; and a method in which a separately prepared organolithium catalyst is added to a hydrocarbon solvent containing at least one conjugated diene monomer to thereby perform a polymerization reaction.

With respect to the rubbery polymer of the present invention which contains the above-mentioned conjugated diene-aromatic vinyl random copolymer (ii) as conjugated diene polymer (A), such a rubbery polymer can be produced by, for example, the following methods:

a method in which an organolithium catalyst is prepared by the above-mentioned reaction, and at least one conjugated diene monomer, at least one aromatic vinyl compound and a polar compound are added to the resultant reaction mixture containing the obtained organolithium catalyst to thereby perform a polymerization reaction;

a method in which a separately prepared organolithium catalyst is added to a hydrocarbon solvent containing at least one conjugated diene monomer, at least one aromatic vinyl compound and a polar compound to thereby perform a polymerization reaction; and a method in which a mixture of at least one conjugated diene monomer and at least one aromatic vinyl compound is portionwise added to a hydrocarbon solvent containing an organolithium catalyst, wherein the mixture is portionwise added to the solvent at intervals, which are individually longer than the time required to complete the polymerization of the monomers contained in the portion of the mixture.

Examples of polar solvents include amines, such as trimethylamine, triethylamine, methyldiethylamine and N,N,N',N'-tetramethylethylenediamine, and ethers, such as dimethyl ether, diethyl ether, tetrahydrofuran and 2,2-bis(2-oxolanyl)propane.

The polar solvent is generally used in an amount of from 30 to 10,000 ppm, based on the amount of the hydrocarbon solvent used in the production of the rubbery polymer.

With respect to the rubbery polymer of the present invention which contains the above-mentioned conjugated diene-aromatic vinyl block copolymer (iii) as conjugated diene polymer (A), such a rubbery polymer can be produced by, for example, the following methods:

a method in which an organolithium catalyst is prepared by the above-mentioned reaction, at least one conjugated diene monomer is added to the resultant reaction mixture containing the obtained organolithium catalyst to thereby perform a polymerization reaction, and after completion of the polymerization reaction, at least one aromatic vinyl compound is added to the resultant reaction mixture to thereby perform a further polymerization reaction;

a method in which an organolithium catalyst is prepared by the above-mentioned reaction, and at least one conjugated diene monomer and at least one aromatic vinyl compound are added to the reaction mixture containing the obtained organolithium catalyst to thereby perform a polymerization reaction;

a method in which a separately prepared organolithium catalyst is added to a hydrocarbon solvent containing at least one conjugated diene monomer to thereby perform a polymerization reaction, and after completion of the polymerization reaction, at least one aromatic vinyl compound is added to the resultant reaction mixture to thereby perform a further polymerization reaction; and a method in which a separately prepared organolithium catalyst is added to a hydrocarbon solvent containing at least one conjugated diene monomer and at least one aromatic vinyl compound to thereby perform a polymerization reaction.

Specific examples of configurations of the rubbery polymer of the present invention include:

(1) $c\text{-}(\alpha)_n$,
(2) $c\text{-}(\alpha\text{-}\beta)_n$,
(3) $c\text{-}(\beta\text{-}\alpha)_n$,
(4) $c\text{-}(\beta\text{-}\alpha\text{-}\beta)_n$,
(5) $c\text{-}(\alpha\text{-}\beta\text{-}\alpha)_n$,
(6) $c\text{-}(\beta\text{-}\alpha\text{-}\beta\text{-}\alpha)_n$, and
(7) $c\text{-}(\alpha\text{-}\beta\text{-}\alpha\text{-}\beta)_n$, wherein:
each $\alpha$ independently represents a polymer block comprised solely of monomer units (a') (derived from at least one conjugated diene monomer) or a polymer block comprised of monomer units (a') and monomer units (b') (derived from at least one aromatic vinyl compound), which has a random configuration or a tapered configuration wherein, on a side remote from the lithium-detached residue, the monomer unit (b') concentration of polymer block $\alpha$ gradually increases;

each $\beta$ independently represents a polymer block comprised mainly of at least one aromatic vinyl compound;

c represents a lithium-detached residue of the organolithium catalyst; and n represents an integer of from 1 to 10.

With respect to the rubbery polymer of the present invention which has the above-mentioned conjugated diene copolymer (i) as polymer (A), the weight average molecular weight ($\overline{M}w$) of the rubbery polymer is generally from 100,000 to 650,000, preferably from 100,000 to 550,000, more preferably from 200,000 to 500,000 as measured by gel permeation chromatography using a calibration curve obtained with respect to standard polystyrene samples. When the rubbery polymer having an $\overline{M}w$ of less than 100,000 is used as a reinforcing agent in a high impact styrene polymer resin composition, the resin composition is disadvantageously caused to have poor impact strength. Further, such a rubbery polymer having an $\overline{M}w$ of more than 650,000 is likely to become powdery and have poor moldability, so that the resin composition containing such a rubbery polymer is difficult to mold into a molded article having a desired shape (such as a bale-shaped molded article).

With respect to the above-mentioned rubbery polymer containing conjugated diene polymer (i), it is preferred that the $\overline{M}w/\overline{M}n$ value (criterion of the molecular weight distribution of the rubbery polymer) is from 1.1 to 3.0. When the rubbery polymer having an $\overline{M}w/\overline{M}n$ value of more than 3.0 is used as a reinforcing agent in a high impact styrene polymer resin composition, disadvantages are likely to be caused such that the distribution of the particle diameters of the rubbery polymer particles dispersed in the resin composition becomes broad and the resin composition contains large-sized rubbery polymer particles, so that the resin composition is caused to have poor luster.

Further, in the rubbery polymer of the present invention containing conjugated diene polymer (i), it is preferred that the content of a moiety of the rubbery polymer which has a molecular weight two or more times a weight average molecular weight corresponding to the peak top (Mwp) of the chromatogram of the rubbery polymer is 20% by weight or less, more preferably 15% by weight or less, still more preferably 10% by weight or less, wherein the chromatogram is obtained by gel permeation chromatography. When the rubbery polymer having the content of the above-mentioned moiety of more than 20% by weight is used as a reinforcing agent in a high impact styrene polymer resin composition, the resin composition is likely to have large-sized rubbery polymer particles, so that the resin composition is caused to have poor luster.

With respect to the rubbery polymer of the present invention which has the above-mentioned conjugated diene-aromatic vinyl random copolymer (ii) as polymer (A), it is preferred that the total content of monomer units (b) and monomer units (b') in the rubbery polymer is 50% by weight or less. When a rubbery polymer having the total content of monomer units (b) and monomer units (b') of more than 50% by weight is used as a reinforcing agent in a high impact styrene polymer resin composition, the resin composition is likely to have a poor balance of impact strength and luster. Specifically, it is likely that such a resin composition has a satisfactory luster, but has poor impact strength.

The weight average molecular weight ($\overline{M}w$) of the rubbery polymer containing random copolymer (ii) is generally from 100,000 to 650,000, preferably from 100,000 to 550,000, more preferably from 200,000 to 500,000 as measured by gel permeation chromatography using a calibration curve obtained with respect to standard polystyrene samples. When the rubbery polymer having an $\overline{M}w$ of less than 100,000 is used as a reinforcing agent in a high impact styrene polymer resin composition, the resin composition is likely to have disadvantageously poor impact strength. When the rubbery polymer having an $\overline{M}w$ of more than 650,000 is used as a reinforcing agent in a high impact styrene polymer resin composition, disadvantages are likely to be caused such that, during the production of the resin composition, a prolonged period of time is necessary for dissolving the rubbery polymer into a solvent containing styrene monomers and for transferring a polymerization reaction mixture from the reactor used for the polymerization, so that the production process becomes cumbersome. Further, such a rubbery polymer having an $\overline{M}w$ of 650,000 or more is likely to become powdery and have poor moldability, so that the resin composition containing such a rubbery polymer is difficult to mold into a molded article having a complicated shape (such as a bale-shaped molded article).

With respect to the above-mentioned rubbery polymer containing random copolymer (ii), it is preferred that the $\overline{M}w/\overline{M}n$ value (criterion of the molecular weight distribution of the rubbery polymer) is from 1.1 to 3.0. When the rubbery polymer having an $\overline{M}w/\overline{M}n$ value of more than 3.0 is used as a reinforcing agent in a high impact styrene polymer resin composition, disadvantages are likely to be caused such that the distribution of the rubbery polymer particles dispersed in the resin composition becomes broad and large-sized rubbery polymer particles are formed in the resin composition, so that the resin composition is caused to have poor luster.

Further, in the rubbery polymer containing random copolymer (ii), it is preferred that the content of a moiety of the rubbery polymer which has a molecular weight two or more times a weight average molecular weight corresponding to the peak top (Mwp) of the chromatogram of the rubbery polymer is 20% by weight or less, more preferably 15% by weight or less, still more preferably 10% by weight or less, wherein the chromatogram is obtained by gel permeation chromatography. When the rubbery polymer having the content of the above-mentioned moiety of more than 20% by weight is used as a reinforcing agent in a high impact styrene polymer resin composition, the resin composition is likely to have large-sized rubbery polymer particles, so that the resin composition is caused to have poor luster.

With respect to the rubbery polymer of the present invention containing, as polymer (A), conjugated diene-aromatic vinyl block copolymer (iii) having a polymer block containing a first polymeric moiety comprised solely of the monomer units (b'), when the amount of monomer units (b') of the first polymeric moiety is less than 10% by weight, based on the total weight of the monomer units (b) in the lithium-detached residue (B) and the monomer units (b') in the conjugated diene polymer (A) {the above-mentioned amount of monomer unit (b') of the first polymeric moiety is hereinafter, frequently referred to simply as a "poly-(b') content"}, such a rubbery polymer is advantageous in that, when the rubbery polymer is used in a high impact styrene polymer resin composition, the resin composition has especially excellent impact strength;

whereas, when the poly-(b') content is 10% by weight or more, such a rubbery polymer is advantageous in that, when the rubbery polymer is used in a high impact styrene polymer resin composition, the resin composition has especially excellent luster.

With respect to the rubbery polymer which contains, as polymer (A), conjugated diene-aromatic vinyl block copolymer (iii) having a polymer block containing a first polymeric moiety comprised solely of the monomer units (b') and which further comprises a second polymeric moiety comprised solely of monomer units (b) in lithium-detached residue (B), when the total amount of monomer units (b') of the first polymeric moiety and monomer unit (b) of the second polymeric moiety is 10% by weight or less, based on the total weight of the monomer units (b) in the lithium-detached residue (B) and the monomer units (b') in the conjugated diene polymer (A) {the above-mentioned total amount of monomer units (b') of the first polymeric moiety and monomer units (b) of the second polymeric moiety is hereinafter, frequently referred to simply as "total content of poly-(b') and poly-(b)"}, such a rubbery polymer is advantageous in that, when the rubbery polymer is used as a reinforcing agent in a high impact styrene polymer resin composition, the resin composition has especially excellent impact strength;

whereas, when the total content of poly-(b') and poly-(b) is more than 10% by weight, such a rubbery polymer is advantageous in that, when the rubbery polymer is used in a high impact styrene polymer resin composition, the resin composition has especially excellent luster.

With respect to each of the rubbery polymer having a poly-(b') content of less than 10% by weight and the rubbery polymer having a total content of poly-(b') and poly-(b) of 10% by weight or less, it is preferred that the total content of monomer units (b) and monomer units (b') in the rubbery polymer is 50% by weight or less.

With respect to each of the above-mentioned rubbery polymers, the weight average molecular weight ($\overline{M}w$) is generally from 100,000 to 650,000, preferably from 100,000 to 550,000, more preferably from 200,000 to 500,000 as measured by gel permeation chromatography using a calibration curve obtained with respect to standard polystyrene samples. When the rubbery polymer having an $\overline{M}w$ of less than 100,000 is used as a reinforcing agent in a high impact styrene polymer resin composition, the resin composition is likely to have disadvantageously poor impact strength. When the rubbery polymer having an $\overline{M}w$ of more than 650,000 is used as a reinforcing agent in a high impact styrene polymer resin composition, disadvantages are likely to be caused such that, during the production of the resin composition, a prolonged period of time is necessary for dissolving the rubbery polymer into a solvent containing styrene monomers and for transferring a polymerization reaction mixture from the reactor used for the polymerization, so that the production process becomes cumbersome. Further, the rubbery polymer having an $\overline{M}w$ of 650,000 or more is likely to become powdery and have poor moldability, so that the resin composition containing such a rubbery polymer is difficult to mold into a molded article having a complicated shape (such as a bale-shaped molded article).

With respect to each of the rubbery polymer having a poly-(b') content of 10% by weight or more and the rubbery polymer having a total content of poly-(b') and poly-(b) of more than 10% by weight, it is preferred that the total content of monomer units (b) and monomer units (b') in the rubbery polymer is from 3 to 50% by weight. When the rubbery polymer having the total content of monomer units (b) and monomer units (b') of more than 50% by weight is used as a reinforcing agent in a high impact styrene polymer resin composition, the resin composition is likely to have a poor balance of impact strength and luster. Specifically, it is likely that such a resin composition has a satisfactory luster, but has poor impact strength.

With respect to each of the above-mentioned rubbery polymers, the weight average molecular weight ($\overline{M}w$) is generally from 100,000 to 600,000, preferably from 100,000 to 450,000, more preferably from 150,000 to 400,000 as measured by gel permeation chromatography using a calibration curve obtained with respect to standard polystyrene samples. When the rubbery polymer having an $\overline{M}w$ of less than 100,000 is used as a reinforcing agent in a high impact styrene polymer resin composition, the resin composition is caused to have disadvantageously poor impact strength. When the rubbery polymer having an $\overline{M}w$ of more than 600,000 is used as a reinforcing agent in a high impact styrene polymer resin composition, disadvantages are likely to be caused such that, during the production of the resin composition, a prolonged period of time is necessary for dissolving the rubbery polymer into a solvent containing styrene monomers and for transferring a polymerization reaction mixture from a reactor used for the polymerization, so that the production process becomes cumbersome. Further, the rubbery polymer having an $\overline{M}w$ of 600,000 or more is likely to be in a powder form and be poor in moldability so that the resin composition containing such a rubbery polymer is difficult to mold into a molded article having a desired shape (such as a bale-shaped molded article).

With respect to the above-mentioned rubbery polymer containing block copolymer (iii), it is preferred that the $\overline{M}w/\overline{M}n$ value (criterion of the molecular weight distribution of the rubbery polymer) is from 1.1 to 3.0. When the rubbery polymer having an $\overline{M}w/\overline{M}n$ value of more than 3.0 is used as a reinforcing agent in a high impact styrene polymer resin composition, disadvantages are likely to be caused such that the distribution of the diameters of the rubbery polymer particles dispersed in the resin composition becomes broad and large-sized rubbery polymer particles are formed in the resin composition, so that the resin composition is caused to have poor luster.

Further, in the rubbery polymer containing block copolymer (iii), the content of a moiety of the rubbery polymer which has a molecular weight two or more times a weight average molecular weight corresponding to the peak top (Mwp) of the chromatogram of the rubbery polymer is 20% by weight or less, wherein the chromatogram is obtained by gel permeation chromatography. When the rubbery polymer having the content of the above-mentioned moiety of more than 20% by weight is used as a reinforcing agent in a high impact styrene polymer resin composition, the resin composition is likely to have large-sized rubbery polymer particles, so that the resin composition is caused to have poor luster.

When the rubbery polymer of the present invention is used as a reinforcing agent in a high impact styrene polymer resin composition, the microstructure of the rubbery polymer affects the impact resistance of the styrene polymer resin composition. When the rubbery polymer contains monomer units (a) and/or monomer units (a') which are derived from butadiene, it is preferred that the total content of the 1,2-vinyl bond in monomer units (a) and monomer units (a') is from 10 to 80%, and it is also preferred that the total content of the cis-1,4 bond in monomer units (a) and monomer units (a') is from 10 to 85%. It is especially preferred that the total content of the 1,2-vinyl bond is from 10 to 40%. When the total content of the 1,2-vinyl bond is outside the range of 10 to 80%, the styrene polymer resin composition containing the rubbery polymer is likely to have poor impact resistance.

With respect to the method for controlling the total content of the 1,2-vinyl bond in monomer units (a) and monomer units (a'), there is no particular limitation, and any of the conventional methods can be used. For example, the total content of the 1,2-vinyl bond can be controlled by a method in which an appropriate modifying agent for the 1,2-vinyl bond content is added to a reaction system for producing the organolithium catalyst and a polymerization reaction system for producing the rubbery polymer. Examples of such modifying agents for the 1,2-vinyl bond content include ethers, such as dimethyl ether, diethyl ether, tetrahydrofuran (THF), bis(2-oxolanyl)ethane, 2,2-bis (oxolanyl)propane and 1,1-bis(oxolanyl)ethane; amines, such as dimethyl amine; and thioethers, such as dimethyl sulfide and diethyl sulfide.

The controlling of the total content of the 1,2-vinyl bond content can also be performed by methods using other modifying agents for the 1,2-vinyl bond content, such as a method in which hexamethylphosphoramide (HMPA) is added to the reaction system (Examined Japanese Patent Application Publication No. 43-5904), a method in which tetramethylethylenediamine (TMEDA) is added to the reaction system (Examined Japanese Patent Application Publication No. 42-17199), and a method in which diethylene glycol dimethyl ether is added to the reaction system.

With respect to the distribution of the 1,2-vinyl bonds in a molecular chain of the rubbery polymer of the present invention, there is no particular limitation. The distribution of the 1,2-vinyl bonds may be of a uniform configuration, a tapered configuration (in which the 1,2-vinyl bond content is continuously decreased along the longitudinal direction of the molecular chain) (Examined Japanese Patent Application Publication No. 47-875), a block-like configuration (U.S. Pat. No. 3,301,840), or a combination thereof.

When it is intended to distribute the 1,2-vinyl bonds uniformly throughout the molecular chain, use can be made of a method in which the polymerization reaction for producing the rubbery polymer is performed at a constant reaction temperature, wherein the temperature falls in the range of from 30 to 90° C. When it is intended to distribute the 1,2-vinyl bonds in a tapered configuration (in which the 1,2-vinyl bond content is continuously decreased along the longitudinal direction of the molecular chain), use can be made of a method in which the polymerization reaction for producing the rubbery polymer is performed under temperature conditions such that the reaction temperature is gradually elevated from an initial reaction temperature of 30 to 80° C. to a final reaction temperature of 85 to 120° C., or a method in which the addition of a modifying agent for the 1,2-vinyl bond content is conducted in a manner such that the agent is added portionwise and the amount of thereof is gradually increased every time the addition is made.

After completion of the polymerization for producing the rubbery polymer of the present invention, if desired, the obtained rubbery polymer may be treated with water, an inorganic acid, an organic acid or the like.

Examples of inorganic acids include sulfuric acid, nitric acid, phosphoric acid, boric acid and carbonic acid.

With respect to the above-mentioned organic acid, various acidic organic compounds can be used without any particular limitation. For example, a carboxylic acid, a sulfonic acid, a sulfinic acid and the like can be mentioned; however, a compound having a carboxyl group is preferred. Examples of organic acids having a carboxyl group include propionic acid, benzoic acid, caprylic acid, lauric acid, myristic acid, palmitic acid, stearic acid, arachic acid, oxalic acid, glutaric acid, adipic acid, malonic acid, oleic acid, linoleic acid and a mixture thereof. Of these, sulfuric acid, carbonic acid, boric acid and stearic acid are especially preferred.

With respect to the method for treating the obtained rubbery polymer using the above-mentioned compounds, there is no particular limitation; however, generally, the treatment of the rubbery polymer is conducted by a method in which, after completion of the polymerization reaction, the above-mentioned compound is added to a polymerization reaction mixture containing the obtained rubbery polymer in a batchwise manner or in a continuous manner.

The recovery of the rubbery polymer from a polymerization reaction mixture can be carried out by, for example, a method in which a stabilizer is added to the polymerization reaction mixture so as to prevent the polymer from deterioration by oxidation and/or heat during the removal of a solvent, and the recovery of the rubbery polymer is conducted by a conventional technique, such as a steam stripping, a drying by using a heat roll or a drum dryer, a methanol deposition-drying method and a vacuum drying. As the above-mentioned stabilizer, any conventional stabilizers, such as known antioxidants, may be used. Examples of antioxidants include phenolic compounds, such as 2,6-di-tert-butyl-4-metylphenol and n-octadecyl-3-(3',5'-di-tert-butyl-4'-hydroxyphenyl)propionate; organic phosphite compounds, such as tris(2,4-di-tert-butylphenyl) phosphite; and sulfur-containing phenolic compounds, such as 2,4-bis[(octylthio)methyl]-O-cresol.

In the present invention, the rubbery polymer may be modified, as long as the properties and characteristics of the polymer are not adversely affected. For example, a carboxyl group, an ester group, a nitrile group, a sulfone group, an amino group or the like may be introduced into the polymer by a chemical reaction. Further, if desired, various additives may be added to the rubbery polymer of the present invention. Examples of additives include inorganic fillers, such as calcium carbonate, magnesium carbonate, zinc oxide, titanium oxide, clay, talc, glass bead and glass fiber; organic reinforcing materials, such as carbon black; organic fibers, such as carbon fiber or a synthetic fiber; adhesives, such as a coumarone-indene resin and a terpene resin; crosslinking agents, such as an organic peroxide, an inorganic peroxide and sulfur; oils, such a paraffinic oil, a naphthenic oil and an aromatic oil; pigments; dye; flame retardants; antistatic agents; lubricants; plasticizers; extender fillers; and a mixture thereof. Each of these additives can be used in an amount such that the properties and characteristics of the rubbery polymer are not adversely affected.

The rubbery polymer of the present invention can also be advantageously used as a material for a hot-melt adhesive composition having excellent adhesive properties. When the rubbery polymer of the present invention is used as a material for a hot-melt adhesive composition, such a composition can be obtained by blending the rubbery polymer of the present invention with an adhesive resin, a softening agent, a reinforcing resin and the like. With respect to the adhesive resin, those which are used in conventional hot-melt adhesives as an adhesiveness-imparting agent can be used. Examples of adhesive resins include a coumaroneindene resin, a phenolic resin, a p-tert-butylphenolacetylene resin, a phenol-formaldehyde resin, a terpene-phenol resin, a polyterpene resin, a xylene-formaldehyde resin, a synthetic polyterpene resin, an oligomer of a monoolefin or a diolefin, an adhesive hydrocarbon resin (such as an aromatic hydrocarbon resin, an aliphatic cyclic hydrocarbon resin and a hydrogenated hydrocarbon resin), a polybutene, an ester produced by reacting a rosin and a polyhdric alcohol, a hydrogenated rosin, a hydrogenated wood rosin, an ester produced by reacting a hydrogenated rosin and a monohydric alcohol or a polyhydric alcohol, and a turpentine type adhesiveness-imparting agent. Examples of softening agents include a petroleum oil softening agent, a paraffin, a vegetable oil softening agent and a plasticizer. Examples of reinforcing resins include polystyrene, polyethylene, an ethylene-propylene copolymer, an ethylene-butene copolymer, an ethylene-vinyl acetate copolymer and a thermoplastic resin, such as a thermoplastic polyester resin having a relatively low molecular weight, a polyamide resin or a polyphenylene ether resin.

The rubbery polymer of the present invention can be used in the form of a mixture thereof with an asphalt. In this case, by appropriately choosing the amount ratio of the rubbery polymer to the asphalt, the mixture can be used in various fields, such as road paving, waterproof sealing, corrosion prevention, under-coating for an automobile, roofing, pipe coating and joint sealing and the like. The use of the rubbery polymer of the present invention in the rubber-asphalt mixture is advantageous in that such a mixture is free from the problems (inevitably accompanying the conventional rubber-asphalt mixture) such that the melt viscosity of the mixture is too high and that the phase separation is likely to occur during the storage of the mixture. Examples of asphalts include straight asphalt, semi-blown asphalt, blown asphalt, tar, pitch, and cut-back asphalt having an oil added thereto. These asphalts may be used individually or in combination. If desired, additives may be added to the rubber-asphalt mixture in an appropriate amount. Examples of additives include inorganic fillers, such as clay, talc, calcium carbonate, zinc oxide and a glass bead; aggregates, such as crushed stones, ballast and sand; fibrous reinforcing materials, such as a glass fiber and asbestos; organic reinforcing agents, such as carbon black; adhesiveness-imparting resins, such as a coumarone-indene resin and a terpene resin; softening agents, such as a paraffin oil, a naphthen oil and an aromatic oil; and thermoplastic resins, such as an polyolefin resin, a polystyrene resin and a vinyl chloride resin.

When the rubbery polymer of the present invention is used as a material for shoe soles, automobile parts and industrial parts and the like, the rubbery polymer of the present invention may be used in the form of a mixture thereof with an inorganic filler, an organic filler, a softening agent and a thermoplastic resin. Examples of inorganic and organic fillers include calcium carbonate, clay, silica, zinc flower, magnesium carbonate, magnesium silicate, talc, diatomite, dolomite, mica powder, aluminum sulfate, barium sulfate, graphite, a glass fiber and carbon black, a high styrene resin, a coumarone-indene resin, a phenol-formaldehyde resin, a modified melamine resin, a petroleum resin, lignin, sawdust and a carbon fiber. Examples of softening agents include a lubricant oil, a processing paraffin oil, a processing naphthen oil, a processing aromatic oil, a paraffin, vaseline, asphalt, a vegetable oil (such as caster oil, cottonseed oil, colza oil or soybean oil), rosin and a fatty acid. Examples of thermoplastic resins include an olefin resin, a styrene resin, an acrylate resin, a vinyl chloride resin, a polyamide resin, a polyester resin, a polycarbonate resin, a polyphenylene ether resin, a polyphenylene sulfide resin, a polyacetal resin and a polyurethane resin. Of these thermoplastic resins, especially preferred are an olefin resin (such as polyethylene, polypropylene or an ethylene-propylene copolymer) and a styrene resin (such as polystyrene and a rubber-modified high impact polystyrene.

For improving the processability or adhesive properties of the rubbery polymer of the present invention, a conventional rubbery polymer (which does not satisfy the requirements of the present invention) may be added to the rubbery polymer of the present invention. Examples of such conventional rubbery polymers include a conventional aromatic vinyl compound-conjugated diene block copolymer elastomer (which generally has a content of a monomer unit derived from the aromatic vinyl compound of not more than 60% by weight) or an aromatic vinyl compound-conjugated diene block copolymer (which generally has a content of a monomer unit derived from the aromatic vinyl compound of more than 60% by weight).

Further, the rubbery polymer of the present invention can also be used as a modifier for the above-mentioned various types of thermoplastic resins.

When the rubbery polymer of the present invention is used in the form of a resin mixture thereof with the above-mentioned additives or the like, the mixing can be conducted by using various conventional mixing apparatuses used for mixing polymer materials, such as a single-screw extruder, a multi-screw extruder, a mixing roll, Banbury mixer and a kneader, depending on the composition of the resin mixture. It is preferred that the mixing be conducted while maintaining the materials in a molten state. Further, the preparation of the resin mixture may also be conducted by, for example, a method in which the respective solutions of the materials are mixed together and the resultant mixed solution is then heated to thereby remove the solvents.

The resin mixture containing the rubbery polymer of the present invention can be easily molded into a wide variety of practically useful products by a conventionally known molding method, such as an extrusion molding, an injection molding or a hollow-forming gas injection molding. For example, the resin mixture can be advantageously used for producing molded products, such as sheets, foamed articles and films. Therefore, the resin mixture can be advantageously used as a molding material in various industrial fields, such as footwear, coating materials for wires and cables, packaging materials for food and automobile parts and various industrial products.

In another aspect of the present invention, there is provided a high impact styrene polymer resin composition which is substantially the same as that obtained by a method comprising subjecting to polymerization:

(i) the rubbery polymer of the present invention, and
(ii) a copolymerizable material consisting of at least one aromatic vinyl compound and a mixture of at least one aromatic vinyl compound and at least one comonomer copolymerizable with the at least one aromatic vinyl compound, wherein the polymerization is selected from the group consisting of a bulk polymerization, a bulk-suspension polymerization and a suspension polymerization.

In the resin composition of the present invention, it is preferred that the rubbery polymer content of the resin composition is 2 to 25% by weight. When a shaped article is produced using the resin composition having the rubbery polymer content of less than 2% by weight, the impact strength of the obtained shaped article is not likely to be satisfactorily improved. On the other hand, when a shaped article is produced using the resin composition having the rubbery polymer content of more than 25% by weight, although the impact strength of the shaped article can be satisfactorily improved, other advantageous features characteristic of a shaped article obtained using a styrene polymer, such as high tensile strength, high rigidity and good appearance (luster) are likely to be impaired. Further, in this case, the viscosity of the polymerization (graft polymerization) system for producing the resin composition becomes very high so that the production of the resin composition becomes difficult.

In the present invention, it is preferred that an average particle diameter of the rubbery polymer particles dispersed in a high-impact styrene polymer resin composition is controlled to be in the range of from 0.05 to 2.5 µm, more preferably from 0.1 to 1.5 µm. When the average particle diameter of the rubbery polymer particles is less than 0.05 µm, a shaped article produced using the resin composition is likely to have a poor impact strength. On the other hand, when an average particle diameter of the rubbery polymer particles is more than 2.5 µm, a shaped article produced using the resin composition is likely to have a poor luster.

Generally, the average particle diameter of the rubbery polymer particles dispersed in a polymer resin compound can be controlled by changing the shearing force applied to the reaction system for the polymerization (by bulk polymerization, bulk-suspension polymerization or solution polymerization) of the rubbery polymer with the above-mentioned copolymerizable material. Specifically, for example, the controlling of the average particle diameter can be achieved by changing the agitation rate of the agitator. In the case of the resin composition of the present invention, by using the above-mentioned method, it is easy to obtain rubbery polymer particles having a small average particle diameter as compared to the case of the conventional rubber-modified resin compositions containing a conventional rubbery polymer.

With respect to the method for producing the high impact styrene polymer resin composition of the present invention, there is no limitation and any conventional methods can be employed. However, it is preferred to employ a method in which a graft polymerization (by bulk polymerization, bulk-suspension polymerization or solution polymerization) is performed by stirring a mixture of the rubbery polymer and the above-mentioned copolymerizable material, to thereby obtain a high impact styrene polymer resin composition, in which the particles of the rubbery polymer are dispersed in a continuous phase comprising a polymer of the at least one aromatic vinyl monomer or a copolymer of the at least one aromatic vinyl monomer and a comonomer copolymerizable with the at least one aromatic vinyl monomer.

Examples of aromatic vinyl monomers usable as the above-mentioned copolymerizable material include styrene; vinyl naphthalene; an α-alkyl-substituted styrene, such as a-methylstyrene, α-ethylstyrene or α-methyl-p-methylstyrene; a styrene having an aromatic nucleus thereof substituted with at least one alkyl group, such as m-methylstyrene, p-methylstyrene, 2,4-dimethylstyrene, ethyl-vinylbenzene and p-tert-butylstyrene; a halogenated styrene, such as monochlorostyrene, dichlorostyrene, tribromostyrene and tetrabromostyrene; and p-hydroxystyrene; o-methoxystyrene. These compounds can be used individually or in combination. Of the above-mentioned aromatic vinyl monomers, α-methylstyrene and p-methylstyrene are preferred.

Examples of comonomers copolymerizable with the aromatic vinyl monomer include an unsaturated nitrile and (meth)acrylic ester.

Examples of unsaturated nitriles include acrylonitrile and methacrylonitrile. Of these, acrylonitrile is preferred.

Examples of (meth)acrylic ester include methyl acrylate, ethyl acrylate, propyl acrylate, butyl acrylate, amyl acrylate, hexyl acrylate, octyl acrylate, dodecyl acrylate, cyclohexyl acrylate, methyl methacrylate, ethyl methacrylate, propyl methacrylate, butyl methacrylate, amyl methacrylate, hexyl methacrylate, octyl methacrylate, dodecyl methacrylate and cyclohexyl methacrylate. These compounds can be used individually or in combination. Of the above-mentioned compounds, methyl methacrylate is preferred.

Further examples of comonomers copolymerizable with the aromatic vinyl compound include acrylic acid, meth-acrylic acid, vinyl acetate, maleic anhydride, N-methyl maleimide and N-phenyl maleimide.

In the production of a high impact styrene polymer resin composition of the present invention, an inert solvent can be added to the mixture of the rubbery polymer and the above-mentioned copolymerizable material. Examples of inert solvents include ethyl benzene, toluene and polar solvents, such as methyl ethyl ketone and cyclohexanone. These solvents can be used individually or in combination. It is preferred that the inert solvent is used in an amount of not more than 100 parts by weight, more preferably not more than 50 parts by weight, relative to 100 parts by weight of the solution of the mixture of the rubbery polymer and the copolymerizable material in the inert solvent.

In the present invention, the radical polymerization of the rubbery polymer and the copolymerizable material may be conducted in the presence of an organic peroxide or an azo compound.

Examples of organic peroxides include peroxy ketals, such as 1,1-bis(tert-butylperoxy)cyclohexane and 1,1-bis (tert-butylperoxy)-3,3,5-trimethylcyclohexane; dialkyl peroxides, such as di-tert-butyl peroxide, 2,5-dimethyl-2,5-di(tert-butylperoxy)hexane and dicumyl peroxide; diacyl peroxides, such as benzoyl peroxide, m-toluoyl peroxide and lauroyl peroxide; peroxydicarbonates, such as dimyristyl peroxydicarbonate and diisopropyl peroxydicarbonate; peroxy esters, such as tert-butyl peroxyisopropyl carbonate, tert-butyl peroxyacetate di-tert-butyl diperoxyisophthalate and tert-butyl peroxybenzoate; ketone peroxides, such as cyclohexanone peroxide and methyl ethyl ketone peroxide; and hydroperoxides, such as p-menthahydroperoxide, tert-butylhydroperoxide and cumene hydroperoxide. Examples of azo compounds include 2,2'-azobisisobutyronitrile and 1,1'-azobis-l-cyclohexanenitrile. These organic peroxides and azo compounds can be used individually or in combination.

The amount of the organic peroxide is preferably within the range of from 10 to 1,000 ppm, based on the amount of the above-mentioned vinyl monomer mixture.

Further, in the present invention, a conventional chain transfer agent is employed. Examples of chain transfer agents include a mercaptan, a terpene and a halogen compound. Specific examples thereof include n-dodecylmercaptan, tert-dodecylmercaptan, an α-methylstyrene dimer, 1-phenylbutene-2-fluorene, dipentene and chloroform.

The resin composition of the present invention may contain a stabilizer, such as an antioxidant or an ultraviolet light stabilizer. Examples of antioxidants include octadecyl-3-(3,5-di-t-butyl-4-hydroxyphenyl)propionate, 2,6-di-t-butyl-4-methylphenol, 2-(1-methylcyclohexyl)-4,6-dimethylphenol, 2,2'-methylenebis(4-ethyl-6-t-butylphenol), 4,4'-thiobis(6-t-butyl-3-methylphenol), 2,4-bis[(octylthio)methyl]-o-cresol, triethylene glycol-bis[3-(3-t-butyl-5-methyl-4-hydroxyphenyl)propionate], tris (dinonylphenyl)phosphite and tris-(2,4-di-t-butylphenyl) phosphite. The amount of the antioxidant is generally from 0.01 to 5 parts by weight, preferably 0.1 to 2 parts by weight, relative to 100 parts by weight of the resin composition.

Examples of ultraviolet light stabilizers include a triazole-containing ultraviolet light stabilizer, such as 2-(5-methyl-2-hydroxyphenyl)benzotriazole and 2-(3,5-di-t-butyl-2-hydroxyphenyl)benzotriazole; a hindered amine-containing ultraviolet light stabilizer, such as bis(2,2,6,6-tetramethyl-4-piperidyl) sebacate; p-t-butylphenyl salicylate; 2,2'-dihydroxy-4-methoxybenzophenone. Among these ultraviolet light stabilizers, it is preferred to use a triazole-containing ultraviolet light stabilizer and a hindered amin-containing ultraviolet light stabilizer individually or in combination. The amount of the ultraviolet light stabilizer is generally from 0.01 to 5 parts by weight, preferably 0.1 to 2 parts by weight, relative to 100 parts by weight of the resin composition.

The resin composition of the present invention may optionally contain a liquid paraffin, a mineral oil or an organic polysiloxane in order to improve the impact resistance and fluidity of the resin composition. For example, poly(dimethylsiloxane), which is one type of organic polysiloxanes, may be used in an amount of from 0.005 to 10 parts by weight, relative to 100 parts of the resin composition.

The gel content (toluene-insolubles content) of the high impact, styrene-containing resin composition is preferably from 5 to 75% by weight, more preferably from 10 to 50% by weight. When the gel content is too low, the impact resistance of the resin composition is poor. On the other hand, when the gel content is too high, the fluidity of the resin composition is low, so that the processability of the resin composition becomes poor. Further, the swelling index of the gel of the resin composition in toluene is preferably from 7 to 15, more preferably from 7 to 12. When the swelling index is too low, the impact resistance of the resin composition is poor. On the other hand, when the swelling index is too high, the impact resistance and luster of the resin composition are poor. The swelling index can be controlled by adjusting the final reaction ratio of the graft polymerization of a vinyl monomer by bulk polymerization, bulk suspension or solution polymerization and also by adjusting the devolatilization temperature for the unreacted monomer.

The weight average molecular weight of the matrix resin is preferably from 70,000 to 400,000, more preferably from 100,000 to 300,000 as measured by gel permeation chromatography, in terms of the value obtained using a calibration curve prepared with respect to the standard polystyrene. When the weight average molecular weight of the matrix resin is less than 70,000, the impact resistance of the resin composition is poor. On the other hand, when the weight average molecular weight of the matrix resin is more than 400,000, the fluidity of the resin composition is low, so that the processability of the resin composition becomes poor.

Further, the resin composition which is obtained by the method of the present invention may optionally contain a combination of a flame retardant and a flame retardant auxiliary. As the flame retardant, there can be mentioned various types of conventional flame retardants. Among these flame retardants, it is preferred to use a halogen-containing flame retardant and a phosphorus-containing flame retardant. Examples of flame retardants include decabromodiphenyl oxide, tetrabromobisphenol A, an oligomer of tetrabromobisphenol A, tris-(2,3-dibromopropyl-1) isocyanurate, ammonium phosphate, a red phosphorus and tricresyl phosphate. Examples of flame retardant auxiliaries include antimony trioxide, antimony pentaoxide, sodium antimonate, antimony trichloride, antimony pentachloride, zinc borate, barium metaborate and zirconium oxide. The amount of the flame retardant is preferably from 5 to 40 parts by weight, relative to 100 parts of the resin composition. The amount of the flame retardant auxiliary is preferably from 2 to 20 parts by weight, relative to 100 parts of the resin composition.

The resin composition of the present invention may optionally contain various additives, such as a lubricant, a mold release agent, a filler, an antistatic agent and a colorant.

Furthermore, the resin composition may have other thermoplastic resins incorporated therein, such as a general purpose polystyrene, an AS resin, an ABS resin, an AES resin, a MBS resin, a polyphenylene ether, a polycarbonate, a copolymer of styrene and butadiene, a methyl methacrylate-styrene copolymer resin, a maleic anhydride-styrene copolymer resin, a polyamide resin and a polyester resin. These resins are incorporated in order to impart the resin composition with various properties, such as improved thermal resistance, stiffness, impact resistance, appearance and coatability.

The resin composition of the present invention is molded by injection molding, extrusion molding or the like. The resin composition of the present invention can be advantageously used as a molding material for producing various useful shaped articles, such as electric appliances; parts for office automation machines, such as a cabinet and a housing; inner trims and outer trims of automobiles; parts for houses and furnitures; parts for antennas, such as a broadcasting antenna and a receiving antenna and the like.

BEST MODE FOR CARRYING OUT THE INVENTION

Hereinbelow, the present invention will be described in more detail with reference to the following Examples and Comparative Examples, which, however, should not be construed as limiting the scope of the present invention.

In the following Examples and Comparative Examples, various properties and characteristics were measured by the following methods. [Weight average molecular weight of organolithium catalyst]

The weight average molecular weight is measured by gel permeation chromatography (GPC), using a calibration curve obtained with respect to standard polystyrene samples. (Conditions for GPC)

Apparatus: LC Module 1 (manufactured and sold by Waters Assoc. Co., USA)

Mobile phase: Chloroform

Columns: Shodex K-801 (×1),
K-802 (×1), and
K-803 (×1)

(3 columns in total; each of the columns is manufactured and sold by Showa Denko K. K., Japan).

Column temperature: 35° C.

Flow rate: 1.0 ml/min.

Concentration of sample: 0.1% by weight

Amount of sample introduced to the column at one time: 0.1 ml

Detector: Shodex RI SE-61 (manufactured and sold by Showa Denko K. K., Japan).

[Weight Average Molecular Weight of Rubbery Polymer]

The weight average molecular weight is measured by gel permeation chromatography (GPC), using a calibration curve obtained with respect to standard polystyrene samples. (Conditions for GPC)

Apparatus: LC Module 1 (manufactured and sold by Waters Assoc. Co., USA)

Mobile phase: Tetrahydrofuran (hereinafter, frequently referred to as "THF")

Columns: PL gel (manufactured and sold by Polymer Laboratories)×3

Column temperature: 35° C.

Flow rate: 0.7 ml/min.

Concentration of sample: 0.1% by weight

Amount of sample introduced to the column at one time: 0.1 ml

Detector: Shodex RI SE-61 (manufactured and sold by Showa Denko K.K., Japan).

[Determination of Microstructure]

With respect to the rubbery polymer having polybutadiene as conjugated diene polymer (A), the determination of the microstructure is conducted by Morero's method (LA Chimica Industria 41, 758, 1959) using an infrared spectrometer FT-IR 1650 (manufactured and sold by Perkin Elmer Cetus Co., USA).

With respect to the rubbery polymer having a styrene-butadiene copolymer as conjugated diene polymer (A), the determination of the microstructure is conducted by Hampton's method (Analytical Chemistry 21, 923, 1949).

[Content of Aromatic Vinyl-derived Monomer Units in Rubbery Polymer (Bound Aromatic Vinyl Monomer Content]

The content of the aromatic vinyl-derived monomer units in the rubbery polymer is determined by a conventional method using an ultraviolet spectrometer UV 200 (manufactured and sold by Hitachi Ltd., Japan). That is, the absorbances at wavelengths of 245 to 280 nm, which are ascribed to a phenyl group, are measured, and the content of the aromatic vinyl-derived monomer unit contained in the rubbery polymer is obtained from the measured absorbances, using a calibration curve obtained with respect to standard polystyrene samples.

[Content of Aromatic Vinyl-derived Monomer Units of Polymeric Moiety in Rubbery Polymer (Block Aromatic Vinyl Monomer Content]

A rubbery polymer is subjected to oxidative degradation using tert-butylhydroperoxide in the presence of osmium tetraoxide as a catalyst [I. M. Kolthoff et al., J. Polym. Sci., 1, 4, 29(1946)] to obtain component aromatic vinyl compound polymers. Then, the amount of the component aromatic vinyl compound polymers (each comprised solely of the aromatic vinyl-derived monomer units) contained in the degradation product is determined by means of an ultraviolet spectrometer UV 200 (manufactured and sold by Hitachi Ltd., Japan). The percent by weight of the amount of the aromatic vinyl-derived monomer units of the component polymers each comprised solely of the aromatic vinyl-derived monomer units, based on the total amount of the aromatic vinyl-derived monomer units in the rubbery polymer prior to the degradation is taken as the content of the aromatic vinyl-derived monomer units of the polymeric moiety.

[Izod Impact Strength]

The resin composition is heated at 180° C. for 7 minutes. Subsequently, the resin composition is subjected to compression molding at 180° C. under a pressure of 200 kg/cm$^2$-G for 2 minutes to thereby obtain a test specimen having a thickness of 3.2 mm. With respect to the obtained test specimen, the Izod impact strength is measured in accordance with JIS-K-7110.

[Luster]

The resin composition is subjected to injection molding to obtain a molded article. With respect to the obtained molded article, the luster at a portion of the molded article which portion corresponds to the gate portion of the injection molding machine and the luster at a portion of the molded article which portion corresponds to the end portion of the injection molding machine are measured in accordance with ASTM D-638 (angle of incidence: 60°) The mean value of the values obtained with respect to the above two portions of the molded article is taken as the luster of the molded article.

[Average Diameter of Rubber Particles]

The diameters of 300 to 600 rubber particles of the obtained resin composition which are measured in an electron microscope photograph (which is taken by the ultrathin section method) of the resin composition are measured, and the weight average particle diameter is obtained by the following formula:

$$\sum_i nD_i^4 \Big/ \sum_i nD_i^3,$$

wherein n is the number of the rubber particles having a diameter of $D_i$.

EXAMPLES 1 to 3

Preparation of Organolithium Catalyst

In each of Examples 1 to 3, the production of an organolithium catalyst was conducted using the materials and conditions as shown in Table 1 in accordance with the following procedure.

A 10-liter autoclave equipped with a stirrer and a jacket, which had been cleaned and dried, was purged with nitrogen gas. 1,3-Butadiene, cyclohexane, tetrahydrofuran and divinylbenzene (each of which had been dried) were charged into the autoclave. Then, n-butyllithium was charged into the autoclave and a reaction was performed at a temperature of 75° C. under a pressure of 6 kg/cm$^2$-G for 1 hour to thereby obtain an organolithium catalyst.

Each of the obtained organolithium catalysts was soluble in cyclohexane and free of gel.

The divinylbenzene used in the production of the above-mentioned organolithium catalyst was a commercially available divinylbenzene product (tradename: DVB-570; manufactured and sold by Nippon Steel Chemical Co., Ltd., Japan) comprised of 56% by weight of a mixture of divinylbenzene isomers (m-divinylbenzene: 40% by weight; p-divinylbenzene: 16% by weight) and 44% by weight of ethylvinylbenzene. EXAMPLES 4 to 6

Preparation of Organolithium Catalyst

In each of Examples 4 to 6, the production of an organolithium catalyst was conducted using the materials and conditions as shown in Table 1 in accordance with the following procedure.

A 10-liter autoclave equipped with a stirrer and a jacket, which had been cleaned and dried, was purged with nitrogen gas. 1,3-Butadiene (80 g), cyclohexane, tetrahydrofuran and divinylbenzene (each of which had been dried) were charged into the autoclave, followed by the addition of n-butyllithium, and a reaction was performed at a temperature of 75° C. under a pressure of 6 kg/cm$^2$-G. Then, 120 g of 1,3-butadiene was charged into the autoclave continuously over 1 hour, and a reaction was further performed at a temperature of 75° C. under a pressure of 6 kg/cm$^2$-G for 30 minutes to thereby obtain an organolithium catalyst.

Each of the obtained organolithium catalysts was soluble in cyclohexane and free of gel.

The divinylbenzene used in the production of the above-mentioned organolithium catalyst was a commercially available divinylbenzene product (tradename: DVB-570; manufactured and sold by Nippon Steel Chemical Co., Ltd., Japan) comprised of 56% by weight of a mixture of divinylbenzene isomers (m-divinylbenzene: 40% by weight;

p-divinylbenzene: 16% by weight) and 44% by weight of ethylvinylbenzene.

EXAMPLES 7 to 9

Preparation of Organolithium Catalyst

In each of Examples 7 to 9, the production of an organolithium catalyst was conducted using the materials and conditions as shown in Table 1 in accordance with the following procedure.

A 10-liter autoclave equipped with a stirrer and a jacket, which had been cleaned and dried, was purged with nitrogen gas. 1,3-Butadiene (80 g), cyclohexane and divinylbenzene (each of which had been dried) were charged into the autoclave, followed by the addition of n-butyllithium, and a reaction was performed at a temperature of 75° C. under a pressure of 6 kg/cm$^2$-G. Then, 120 g of 1,3-butadiene was charged into the autoclave continuously over 1 hour. Then, a reaction was further performed at a temperature of 75° C. under a pressure of 6 kg/cm$^2$-G for 30 minutes to thereby obtain an organolithium catalyst.

Each of the obtained organolithium catalysts was soluble in cyclohexane and free of gel.

The gel permeation chromatogram of the organolithium catalyst obtained in Example 8 is shown in FIG. 1 by a broken line.

In each of Examples 7 and 9, the divinylbenzene used in the production of the above-mentioned organolithium catalyst was a commercially available divinylbenzene product (tradename: DVB-570; manufactured and sold by Nippon Steel Chemical Co., Ltd., Japan) comprised of 56% by weight of a mixture of divinylbenzene isomers (m-divinylbenzene: 40% by weight; p-divinylbenzene: 16% by weight) and 44% by weight of ethylvinylbenzene.

In Example 8, m-divinylbenzene was used in the production of the above-mentioned organolithium catalyst instead of the above-mentioned DVB-50 which was used in Examples 7 and 9.

EXAMPLE 10

The production of an organolithium catalyst was conducted in substantially the same manner as in Example 1, except that use was made of N,N,N',N'-tetramethylethylenediamine as a polar compound instead of THF.

EXAMPLE 11

The production of an organolithium catalyst was conducted in substantially the same manner as in Example 1, except that use was made of m-diisopropenylbenzene as a multi-vinyl aromatic compound instead of divinylbenzene.

COMPARATIVE EXAMPLES 1 to 5

In each of Comparative Examples 1 to 5, the production of an organolithium catalyst was conducted in substantially the same manner as in Example 1, except that the amounts of materials are changed as shown in Table 2. As can be seen from Table 2, in Comparative Example 5 in which the content of divinylbenzene in the organolithium catalyst was 43% by weight, the obtained organolithium catalyst contained gel.

The gel permeation chromatogram of the organolithium catalyst obtained in Comparative Example 3 is shown in FIG. 1 by a solid line.

EXAMPLES 12 to 27

Production of Styrene-butadiene Block Copolymer

In each of Examples 12 to 27, the production of a styrene-butadiene block copolymer was conducted using the materials and conditions as shown in Tables 3 and 4 in accordance with the following procedure.

A 10-liter autoclave equipped with a stirrer and a jacket, which had been cleaned and dried, was purged with nitrogen gas. 1,3-Butadiene and cyclohexane (each 10 of which had been purified and dried) were charged into the autoclave, followed by the addition of THF (which had been purified and dried and which was used to control the amount of the 1,2-vinyl bond). Then, an organolithium catalyst was charged into the autoclave and a polymerization reaction was performed at a temperature of 60° C. under a pressure of 6 kg/cm$^2$-G. After completion of the polymerization reaction, styrene was charged into the autoclave and a polymerization reaction was further performed. After completion of the polymerization reaction, to the resultant reaction mixture was added methanol to completely inactivate the living polymer formed in the reaction mixture, thereby obtaining a reaction mixture containing a styrenebutadiene block copolymer. Then, to the resultant reaction mixture was added 2,6-di-tert-butyl-4-methylphenol as a stabilizer in an amount of 0.5 part by weight, relative to 100 parts by weight of the polymer, followed by a steam stripping to thereby remove the solvent. The resultant product was dehydrated, followed by drying by means of a heat roll (110° C.) to thereby obtain a styrene-butadiene block copolymer.

As mentioned above, using the materials and conditions as shown in Tables 3 and 4, substantially the same procedure as mentioned above was conducted to obtain styrene-butadiene block copolymers as shown in Tables 3 and 4.

EXAMPLE 28

Production of Styrene-butadiene Block Copolymer

The production of a styrene-butadiene block copolymer was conducted using the materials and conditions as shown in Table 4 in accordance with the following procedure.

A 10-liter autoclave equipped with a stirrer and a jacket, which had been cleaned and dried, was purged with nitrogen gas. 1,3-Butadiene, styrene and cyclohexane (each of which had been purified and dried) were charged into the autoclave, followed by the addition of THF (which had been purified and dried and which was used to control the amount of the 1,2-vinyl bond). Then, an organolithium catalyst was charged into the autoclave and a polymerization reaction was performed at a temperature of 60° C. under a pressure of 6 kg/cm$^2$-G. After completion of the polymerization reaction, to the resultant reaction mixture was added methanol to completely inactivate the living polymer formed in the reaction mixture, thereby obtaining a reaction mixture containing a styrene-butadiene block copolymer. Then, to the resultant reaction mixture was added 2,6-di-tert-butyl-4-methylphenol as a stabilizer in an amount of 0.5 part by weight, relative to 100 parts by weight of the polymer, followed by a steam stripping to thereby remove the solvent. The resultant product was dehydrated, followed by drying by means of a heat roll (110° C.) to thereby obtain a styrene-butadiene block copolymer as shown in Table 4.

EXAMPLES 29 to 39

Production of Polybutadiene:

EXAMPLES 30 to 32, 34, 35 and 37 to 39

In each of Examples 30 to 32, 34, 35 and 37 to 39, the production of polybutadiene was conducted using the materials and conditions as shown in Tables 5 and 6 in accordance with the following procedure.

A 10-liter autoclave equipped with a stirrer and a jacket, which had been cleaned and dried, was purged with nitrogen gas. 1,3-Butadiene and cyclohexane (each of which had been purified and dried) were charged into the autoclave, followed by the addition of THF (which had been purified and dried and which was used to control the amount of the 1,2-vinyl bond) (in Example 35, THF was not added). Then, an organolithium catalyst was charged into the autoclave and a polymerization reaction was performed at a temperature of 60° C. under a pressure of 6 kg/cm$^2$-G. After completion of the polymerization reaction, to the resultant reaction mixture was added methanol to completely inactivate the living polymer formed in the reaction mixture, thereby obtaining a reaction mixture containing polybutadiene. Then, to the resultant reaction mixture was added 2,6-di-tert-butyl-4-methylphenol as a stabilizer in an amount of 0.5 part by weight, relative to 100 parts by weight of the polymer, followed by a steam stripping to thereby remove the solvent. The resultant product was dehydrated, followed by drying by means of a heat roll (110° C.) to thereby obtain polybutadiene.

As mentioned above, using the materials and conditions as shown in Tables 5 and 6, substantially the same procedure as mentioned above was conducted to obtain polybutadienes as shown in Tables 5 and 6.

Production of Styrene-butadiene Copolymer:
Examples 29 and 33

In each of Examples 29 and 33, the production of a styrene-butadiene copolymer was conducted using the materials and conditions as shown in Table 5 in accordance with the following procedure.

A 10-liter autoclave equipped with a stirrer and a jacket, which had been cleaned and dried, was purged with nitrogen gas. 1,3-Butadiene (in Example 29: 336 g; in Example 33: 272 g), styrene and cyclohexane (each of which had been purified and dried) were charged into the autoclave, followed by the addition of THF (which had been purified and dried and which was used to control the amount of the 1,2-vinyl bond). Then, an organolithium catalyst was charged into the autoclave and a polymerization reaction was performed at a temperature of 60° C. under a pressure of 6 kg/cm$^2$-G. When the conversion reached 20%, 1,3-butadiene (in Example 29: 252 g; in Example 33: 204 g) was charged into the autoclave at a constant charging rate over 10 minutes. After completion of the polymerization reaction, to the resultant reaction mixture was added methanol to completely inactivate the living polymer formed in the reaction mixture, thereby obtaining a reaction mixture containing a styrene-butadiene copolymer. Then, to the resultant reaction mixture was added 2,6-di-tert-butyl-4-methylphenol as a stabilizer in an amount of 0.5 part by weight, relative to 100 parts by weight of the polymer, followed by a steam stripping to thereby remove the solvent. The resultant product was dehydrated, followed by drying by means of a heat roll (110° C.) to thereby obtain a styrene-butadiene copolymer.

As mentioned above, using the materials and conditions as shown in Table 5, substantially the same procedure as mentioned above was conducted to obtain styrene-butadiene copolymers as shown in Table 5.

Production of Styrene-butadiene Copolymer:
Example 36

The production of a styrene-butadiene copolymer was conducted using the materials and conditions as shown in Table 6 in accordance with the following procedure.

A 10-liter autoclave equipped with a stirrer and a jacket, which had been cleaned and dried, was purged with nitrogen gas. 1,3-Butadiene, styrene and cyclohexane (each of which had been purified and dried) were charged into the autoclave, followed by the addition of THF (which had been purified and dried and which was used as a randomizer for obtaining a polymer having a random configuration). Then, an organolithium catalyst was charged into the autoclave and a polymerization reaction was performed at a temperature of 60° C. under a pressure of 6 kg/cm$^2$-G. After completion of the polymerization reaction, to the resultant reaction mixture was added methanol to completely inactivate the living polymer formed in the reaction mixture, thereby obtaining a reaction mixture containing a styrene-butadiene copolymer. Then, to the resultant reaction mixture was added 2,6-di-tert-butyl-4-methylphenol as a stabilizer in an amount of 0.5 part by weight, relative to 100 parts by weight of the polymer, followed by a steam stripping to thereby remove the solvent. The resultant product was dehydrated, followed by drying by means of a heat roll (110° C.) to thereby obtain a styrene-butadiene copolymer as shown in Table 6.

EXAMPLES 40 to 67

Production of High Impact Styrene Polymer Resin Composition: Examples 40, 42, 44 to 46, 48 to 51, 53, 55, 56, 58, 59, 62, 63, and 65 to 67

In each of the Examples, the production of a high-impact styrene polymer resin composition was conducted using the materials and conditions as shown in Tables 7 to 9 by bulk polymerization as described below.

Ethylbenzene and styrene were charged into a reactor equipped with a stirrer and a jacket. Then, a rubbery polymer and, as stabilizers, 0.3 part by weight of n-octadecyl-3-(3', 5'-di-tert-butyl-4'-hydroxyphenyl)propionate and 0.05 part by weight of tert-dodecylmercaptan were charged into the reactor, followed by stirring to thereby obtain a solution. To the obtained solution was added di-tert-butyl peroxide in an amount of $1 \times 10^{-4}$ mole per mole of the styrene monomer and a polymerization reaction was performed under a pressure of 6 kg/cm$^2$-G, wherein the reaction temperature was changed according to the progress of the reaction in the following manner: 110° C. for 3 hours, 140° C. for 5 hours, 180° C. for 2 hours, and 230° C. for 30 minutes; to thereby obtain a reaction mixture. Subsequently, the unreacted compounds remaining in the obtained reaction mixture were distilled off under reduced pressure to obtain a high impact styrene polymer resin composition. The obtained resin composition was pulverized and then subjected to extrusion to thereby obtain pellets.

As mentioned above, using the materials and conditions as shown in Tables 7 to 9, substantially the same procedure as mentioned above was conducted to obtain high impact styrene polymer resin compositions. The properties of each of the obtained high-impact styrene polymer resin compositions are shown in Tables 7 to 9. As can be seen from Tables 7 to 9, each of the resin compositions produced using the rubbery polymer of the present invention has an excellent balance of luster and impact strength.

On the other hand, as is apparent from the results of Comparative Examples 14 to 21 below, when the production of a high-impact styrene polymer resin composition is conducted using a polymer which does not satisfy the requirements of the present invention, the obtained resin composition is poor with respect to either of luster and impact strength.

Production of ABS Resin: Examples 41, 43, 47, 52, 57, 60 and 61

In each of these Examples, the production of an ABS resin was conducted using the materials and conditions as shown in Tables 7 and 9 in accordance with the procedure as described below, wherein use was made of the same reactor as used in Example 40.

Ethylbenzene, styrene and acrylonitrile were charged into the reactor. Then, a rubbery polymer and, as stabilizers, 0.3 part by weight of n-octadecyl-3-(3',5'-di-tert-butyl-4'-hydroxyphenyl)propionate and 0.05 part by weight of tert-dodecylmercaptan were charged into the reactor, followed by stirring to thereby obtain a solution. To the obtained solution was added di-tert-butyl peroxide in an amount of 160 ppm by weight, based on the total weight of the monomers (i.e., styrene and acrylonitrile) and a polymerization reaction was performed under a pressure of 6 $kg/cm^2$-G, wherein the reaction temperature was changed according to the progress of the reaction in the following manner: 110° C. for 3 hours, 140° C. for 5 hours, 180° C. for 2 hours, and 230° C. for 30 minutes; to thereby obtain a reaction mixture. Subsequently, the unreacted compounds remaining in the obtained reaction mixture were distilled off under reduced pressure to obtain an ABS resin. The obtained ABS resin was pulverized and then subjected to extrusion to thereby obtain pellets.

As mentioned above, using the materials and conditions as shown in Tables 7 and 9, substantially the same procedure as mentioned above was conducted to obtain ABS resins. The properties of each of the obtained ABS resins are shown in Tables 7 and 9. As can be seen from Tables 7 and 9, with respect to each of the ABS resins produced using the rubbery polymer of the present invention, the average particle diameter of the rubber-particles dispersed in the ABS resin is advantageously small, and the balance of luster and impact strength is excellent.

Production of MBS Resin: Examples 54 and 64

In each of these Examples, the production of an MBS resin was conducted using the materials and conditions as shown in Tables 8 and 9 in accordance with the procedure as described below, wherein use was made of the same reactor as used in Example 40.

Ethylbenzene, styrene and methyl methacrylate were charged into a reactor equipped with a stirrer and a jacket. Then, a rubbery polymer and, as stabilizers, 0.3 part by weight of n-octadecyl-3-(3',5'-di-tert-butyl-4'-hydroxyphenyl)propionate and 0.05 part by weight of tert-dodecylmercaptan were charged into the reactor, followed by stirring to thereby obtain a solution. To the obtained solution was added di-tert-butyl peroxide in an amount of 160 ppm by weight, based on the total weight of the monomers (i.e., styrene and methyl methacrylate) and a polymerization reaction was performed under a pressure of 6 $kg/cm^2$-G, wherein the reaction temperature was changed according to the progress of the reaction in the following manner: 110° C. for 3 hours, 140° C. for 5 hours, 180° C. for 2 hours, and 230° C. for 30 minutes; to thereby obtain a reaction mixture. Subsequently, the unreacted compounds remaining in the obtained reaction mixture were distilled off under reduced pressure to obtain an MBS resin composition. The obtained resin composition was pulverized and then subjected to extrusion to thereby obtain pellets.

As mentioned above, using the materials and conditions as shown in Tables 8 and 9, substantially the same procedure as mentioned above was conducted to obtain MBS resins. The properties of each of the obtained MBS resins are shown in Tables 8 and 9. As can be seen from Tables 8 and 9, each of the MBS resins produced using the rubbery polymer of the present invention has an excellent balance of luster and impact strength.

Comparative Examples 6 to 13

Production of Rubbery Polymer

In each of Comparative Examples 6 to 9, the production of a rubbery polymer was conducted in substantially the same manner as in Example 12, except that the catalysts obtained in Comparative Examples 1 to 5 were individually used as shown in Table 10, and that the amounts of materials were changed as shown in Table 10 Results are also shown in Table 10.

In each of Comparative Examples 10 to 12, the production of a rubbery polymer was conducted in substantially the same manner as in Example 30, except that the catalysts obtained in Comparative Examples 1 to 5 were individually used as shown in Table 10, and that the amounts of materials were changed as shown in Table 10. Results are also shown in Table 10.

EXAMPLES 14 to 21

Production of High Impact Styrene Polymer Resin Composition

In each of Comparative Examples 14 to 21, the production of a high impact styrene polymer resin composition was conducted in substantially the same manner as in Example 40, except that the rubbery polymers individually obtained in Comparative Examples 6 to 13 were used as shown in Table 11.

The properties of each of the obtained resin compositions are shown in Table 11.

As is apparent from the results shown in Table 11, when a styrene polymer resin compositions are produced using rubbery polymers which do not satisfy the requirements of the present invention, the obtained resin compositions are poor with respect to either of luster and impact strength.

TABLE 1

| | | Example No. | | | | | | | | | | |
|---|---|---|---|---|---|---|---|---|---|---|---|---|
| | | 1 | 2 | 3 | 4 | 5 | 6 | 7 | 8 | 9 | 10 | 11 |
| | | Organolithium catalyst | | | | | | | | | | |
| | | A | B | C | D | E | F | G | H | I | J | K |
| Amounts of materials | Divinylbenzene (g) | 15.9 | 26.4 | 39.7 | 23.8 | 42.3 | 79.3 | 13.2 | 26.4 | 39.7 | 15.9 | — |
| | m-Diisopropyl-benzene (g) | — | — | — | — | — | — | — | — | — | — | 45.0 |
| | n-Butyllithium (NBL) (g) | 26.0 | 26.0 | 26.0 | 26.0 | 26.0 | 26.0 | 26.0 | 26.0 | 26.0 | 26.0 | 26.0 |
| | DVB *1 / NBL (molar ratio) | 0.30 | 0.50 | 0.75 | 0.45 | 0.80 | 1.50 | 0.25 | 0.50 | 0.75 | 0.30 | 0.70 |
| | 1,3-Butadiene (g) | 200 | 200 | 200 | 200 | 200 | 200 | 200 | 200 | 200 | 200 | 200 |
| | Cyclohexane (g) | 1,200 | 1,200 | 1,200 | 1,200 | 1,200 | 1,200 | 1,200 | 1,200 | 1,200 | 1,200 | 1,200 |
| | THF *2 (ppm) | 10,000 | 5,000 | 10,000 | 3,000 | 10,000 | 15,000 | — | — | — | 700 | 5,000 |
| | Content (% by weight) of multi-vinyl aromatic compound | 7.4 | 11.7 | 16.6 | 10.6 | 17.5 | 28.4 | 6.2 | 11.7 | 16.6 | 7.4 (TMEDA) *3 | 18.4 |
| Reaction conditions | Temperature (° C.) | 75 | 75 | 75 | 75 | 75 | 75 | 75 | 75 | 75 | 75 | 75 |
| | Time (min) | 60 | 60 | 60 | 60 | 60 | 60 | 60 | 60 | 60 | 60 | 60 |
| | Gel in reaction product | Not observed | Not observed | Not observed | Not observed | Not observed | Not observed | Not observed | Not observed | Not observed | Not observed | Not observed |
| Properties | $\overline{Mw}$ | 2,700 | 3,800 | 5,300 | 2,500 | 6,300 | 8,800 | 2,600 | 3,500 | 9,800 | 2.100 | 3,100 |
| | $\overline{Mw}/\overline{Mn}$ | 1.4 | 1.9 | 2.1 | 1.6 | 1.9 | 2.3 | 1.3 | 1.9 | 2.9 | 1.7 | 1.7 |

*1: DVB: Divinylbenzene
*2: THF: Tetrahydrofuran
*3: TMEDA: N,N,N',N'-tetramethylethylenediamine

TABLE 2

| | Comparative Example No. | | | | |
|---|---|---|---|---|---|
| | 1 | 2 | 3 | 4 | 5 |
| Organolithium catalyst | L | M | N | O | P |
| Amounts of materials | | | | | |
| Divinylbenzene (g) | 111.1 | 42.3 | 18.5 | 52.9 | 26.4 |
| n-Butyllithium (NBL) (g) | 26.0 | 26.0 | 26.0 | 26.0 | 26.0 |
| DVB *1/NBL (molar ratio) | 2.10 | 0.80 | 0.35 | 1.0 | 0.50 |
| 1,3-Butadiene (g) | 200 | 200 | 200 | 500 | 35 |
| Cyclohexane (g) | 1,200 | 1,200 | 1,200 | 1,200 | 1,200 |
| THF *2 (ppm) | 10,000 | 5,000 | — | 10,000 | 10,000 |
| Content (% by weight) of multi-vinyl aromatic compound | 35.7 | 17.5 | 8.5 | 9.6 | 43.0 |
| Reaction conditions | | | | | |
| Temperature (° C.) | 75 | 75 | 75 | 75 | 75 |
| Time (min) | 60 | 60 | 60 | 60 | 60 |

TABLE 2-continued

| | Comparative Example No. | | | | |
|---|---|---|---|---|---|
| | 1 | 2 | 3 | 4 | 5 |
| Organolithium catalyst | L | M | N | O | P |
| Gel in reaction product | Not observed | Not observed | Not observed | Not observed | Slightly observed |
| Properties | | | | | |
| $\overline{Mw}$ | 25,500 | 2,100 | 9,300 | 15,500 | — |
| $\overline{Mw}/\overline{Mn}$ | 4.9 | 4.0 | 3.6 | 3.8 | — |

*1: DVB: Divinylbenzene
*2: THF: Tetrahydrofuran
*3: TMEDA: N,N,N',N'-tetramethylethylenediamine

TABLE 3

| Example No. | | 12 | 13 | 14 | 15 | 16 | 17 | 18 | 19 |
|---|---|---|---|---|---|---|---|---|---|
| Rubbery polymer sample No. | | 12 | 13 | 14 | 15 | 16 | 17 | 18 | 19 |
| Amounts of materials | Cyclohexane (g) | 5,000 | 5,000 | 5,000 | 5,000 | 5,000 | 5,000 | 5,000 | 5,000 |
| | Tetrahydrofuran (g) | 1.2 | 1.2 | 1.2 | 1.2 | 1.2 | 1.2 | 1.2 | 15.0 |
| | 1,3-Butadiene (g) | 560 | 644 | 665 | 588 | 630 | 672 | 546 | 609 |
| | Styrene (g) | 140 | 56 | 35 | 112 | 70 | 28 | 154 | 91 |
| | Organolithium catalyst | A | B | C | D | E | F | G | H |
| | Amount of catalyst *1 (g) | 0.66 | 0.62 | 0.57 | 0.60 | 0.57 | 0.55 | 0.67 | 0.61 |

TABLE 3-continued

| Example No. | | 12 | 13 | 14 | 15 | 16 | 17 | 18 | 19 |
|---|---|---|---|---|---|---|---|---|---|
| Properties and characteristics of rubbery polymer | $\overline{M}w$ | 209,000 | 267,000 | 369,000 | 295,000 | 373,000 | 445,000 | 201,000 | 286,000 |
| | Bound styrene *4 content (% by weight) | 20 | 8 | 5 | 16 | 10 | 4 | 22 | 13 |
| | Block styrene *5 content (% by weight) | 18 | 17 | 4 | 14 | 9 | 3 | 20 | 13 |
| | Block styrene ratio (%) *2 | 90 | 88 | 80 | 88 | 90 | 75 | 91 | 100 |
| | Microstructure {1,2-vinyl content (%)} | 17 | 16 | 17 | 15 | 15 | 18 | 14 | 35 |
| | Content (% by weight) of ≧ MWP × 2 *3 | 4 | 7 | 9 | 5 | 10 | 18 | 3 | 6 |
| | $\overline{M}w/\overline{M}n$ | 1.1 | 1.1 | 1.2 | 1.1 | 1.2 | 1.5 | 1.1 | 1.1 |

*1: The weight (g) of the organolithium catalyst is shown in terms of the weight (g) of n-butyllithium used in the production of a styrene-butadiene block copolymer.

*2:
$$\text{Block styrene ratio (\%)} = \frac{\text{Block aromatic vinyl monomer content}}{\text{Bound aromatic vinyl monomer content}} \times 100$$

*3: The content of a moiety of the rubbery polymer which has a molecular weight two or more times a weight average molecular weight corresponding to the peak top of the chromatogram of the rubbery polymer.
*4: Bound aromatic vinyl monomer content
*5: Block aromatic vinyl monomer content

TABLE 4

| Example No. | | 20 | 21 | 22 | 23 | 24 |
|---|---|---|---|---|---|---|
| Rubbery polymer sample No. | | 20 | 21 | 22 | 23 | 24 |
| Amounts of materials | Cyclohexane (g) | 5,000 | 5,000 | 5,000 | 5,000 | 5,000 |
| | Tetrahydrofuran (g) | 1.2 | 1.2 | 1.2 | — | 1.2 |
| | 1,3-Butadiene (g) | 665 | 630 | 651 | 455 | 427 |
| | Styrene (g) | 35 | 70 | 49 | 245 | 273 |
| | Organolithium catalyst | I | J | K | D | C |
| | Amount of catalyst *1 (g) | 0.56 | 0.60 | 0.60 | 0.66 | 0.55 |
| Properties and characteristics of rubbery polymer | $\overline{M}w$ | 394,000 | 302,000 | 292,000 | 214,000 | 448,000 |
| | Bound styrene *4 content (% by weight) | 5 | 10 | 7 | 35 | 39 |
| | Block styrene *5 content (% by weight) | 4 | 9 | 6 | 33 | 38 |
| | Block styrene ratio (%) *2 | 80 | 90 | 86 | 94 | 97 |
| | Microstructure {1,2-vinyl content (%)} | 14 | 38 | 16 | 11 | 17 |
| | $\overline{M}w/\overline{M}n$ | 1.3 | 1.1 | 1.2 | 1.1 | 1.2 |

| Example No. | | 25 | 26 | 27 | 28 |
|---|---|---|---|---|---|
| Rubbery polymer sample No. | | 25 | 26 | 27 | 28 |
| Amounts of materials | Cyclohexane (g) | 5,000 | 5,000 | 5,000 | 5,000 |
| | Tetrahydrofuran (g) | 1.2 | 1.2 | 1.2 | 1.2 |
| | 1,3-Butadiene (g) | 518 | 609 | 637 | 476 |
| | Styrene (g) | 182 | 91 | 63 | 224 |
| | Organolithium catalyst | E | H | F | I |
| | Amount of catalyst *1 (g) | 0.54 | 0.54 | 0.54 | 0.57 |
| Properties and characteristics of rubbery polymer | $\overline{M}w$ | 505,000 | 476,000 | 513,000 | 365,000 |
| | Bound styrene *4 content (% by weight) | 26 | 13 | 9 | 32 |
| | Block styrene *5 content (% by weight) | 25 | 12 | 8 | 18 |
| | Block styrene ratio | 96 | 92 | 89 | 56 |

TABLE 4-continued

| | | | | | |
|---|---|---|---|---|---|
| (%) *2 Microstructure {1,2-vinyl content (%)} | | 15 | 14 | 18 | 15 |
| Content (% by weight) of ≥ Mwp × 2 *3 | | 10 | 7 | 18 | 13 |
| $\overline{Mw}/\overline{Mn}$ | | 1.2 | 1.2 | 1.5 | 1.3 |

*1: The weight (g) of the organolithium catalyst is shown in terms of the weight (g) of n-butyllithium used in the production of a styrene-butadiene block copolymer.

*2:
$$\text{Block styrene ratio (\%)} = \frac{\text{Block aromatic vinyl monomer content}}{\text{Bound aromatic vinyl monomer content}} \times 100$$

*3: The content of a moiety of the rubbery polymer which has a molecular weight two or more times a weight average molecular weight corresponding to the peak top of the chromatogram of the rubbery polymer.
*4: Bound aromatic vinyl monomer content
*5: Block aromatic vinyl monomer content

TABLE 5

| Example No. | | 29 | 30 | 31 | 32 | 33 | 34 |
|---|---|---|---|---|---|---|---|
| Rubbery polymer sample No. | | 29 | 30 | 31 | 32 | 33 | 34 |
| Amounts of materials | Cyclohexane (g) | 5,000 | 5,000 | 5,000 | 5,000 | 5,000 | 5,000 |
| | Tetrahydrofuran (g) | 1.2 | 1.2 | 1.2 | 1.2 | 1.2 | 1.2 |
| | 1,3-Butadiene (g) | 588 | 700 | 700 | 700 | 476 | 700 |
| | Styrene (g) | 112 | — | — | — | 224 | — |
| | Organolithium catalyst | A | B | C | D | E | F |
| | Amount of catalyst *1 (g) | 0.67 | 0.59 | 0.71 | 0.61 | 0.57 | 0.54 |
| Properties and characteristics of rubbery polymer | $\overline{Mw}$ | 204,000 | 325,000 | 486,000 | 286,000 | 364,000 | 513.000 |
| | Bound styrene *4 content (% by weight) | 16 | — | — | — | 32 | — |
| | Block styrene *5 content (% by weight) | 0 | — | — | — | 0 | — |
| | Block styrene ratio (%) *2 | 0 | — | — | — | 0 | — |
| | Microstructure {1,2-vinyl content (%)} | 17 | 19 | 20 | 18 | 15 | 18 |
| | Content (% by weight) of ≥ MWP × 2 *3 | 4 | 7 | 9 | 5 | 10 | 18 |
| | $\overline{Mw}/\overline{Mn}$ | 1.1 | 1.2 | 1.2 | 1.1 | 1.2 | 1.5 |

*1: The weight (g) of the organolithium catalyst is shown in terms of the weight (g) of n-butyllithium used in the production of a styrene-butadiene block copolymer.

*2:
$$\text{Block styrene ratio (\%)} = \frac{\text{Block aromatic vinyl monomer content}}{\text{Bound aromatic vinyl monomer content}} \times 100$$

*3: The content of a rnoiety of the rubbery polymer which has a molecular weight two or more times a weight average molecular weight corresponding to the peak top of the chromatogram of the rubbery polymer.
*4: Bound aromatic vinyl monomer content
*5: Block aromatic vinyl monomer content

TABLE 6

| Example No. | 35 | 36 | 37 | 38 | 39 |
|---|---|---|---|---|---|
| Rubbery polymer sample No. | 35 | 36 | 37 | 38 | 39 |
| Amounts of materials | | | | | |
| Cyclohexane (g) | 5,000 | 5,000 | 5,000 | 5,000 | 5.000 |
| Tetrahydrofuran (g) | — | 10.5 | 1.2 | 1.2 | 1.2 |

TABLE 6-continued

| Example No. | 35 | 36 | 37 | 38 | 39 |
|---|---|---|---|---|---|
| Rubbery polymer sample No. | 35 | 36 | 37 | 38 | 39 |
| 1,3-Butadiene (g) | 700 | 546 | 700 | 700 | 700 |
| Styrene (g) | — | 154 | — | — | — |
| Organolithium catalyst | G | H | I | J | K |
| Amount of catalyst*¹ (g) | 0.64 | 0.58 | 0.54 | 0.60 | 0.60 |
| Properties and characteristics of rubbery polymer | | | | | |
| $\overline{M}w$ | 234,000 | 334,000 | 495,000 | 302,000 | 292,000 |
| Bound styrene*⁴ content (% by weight) | — | 22 | — | — | — |
| Block styrene*⁵ content (% by weight) | — | 1 | — | — | — |
| Block styrene ratio (%)*² | — | 5 | — | — | — |
| Microstructure {1,2-vinyl content (%)} | 15 | 30 | 18 | 41 | 20 |
| Content (% by weight) of ≥ Mwp × 2*³ | 3 | 6 | 13 | 4 | 8 |
| $\overline{M}w/\overline{M}n$ | 1.1 | 1.2 | 1.3 | 1.1 | 1.2 |

*¹The weight (g) of the organolithium catalyst is shown in terms of the weight (g) of n-butyllithium used in the production of a styrene-butadiene block copolymer.

*²Block styrene ratio (%) = $\dfrac{\text{Block aromatic vinyl monomer content}}{\text{Bound aromatic vinyl monomer content}} \times 100$

*³The content of a moiety of the rubbery polymer which has a molecular weight two or more times a weight average molecular weight corresponding to the peak top of the chromatogram of the rubbery polymer.

*⁴Bound aromatic vinyl monomer content

*⁵Block aromatic vinyl monomer content

TABLE 7

| | | Example No. | | | | | | | | | | | | |
|---|---|---|---|---|---|---|---|---|---|---|---|---|---|---|
| | | 40 | 41 | 42 | 43 | 44 | 45 | 46 | 47 | 48 | 49 | 50 | 51 | 52 |
| | | Rubbery polymer sample No. | | | | | | | | | | | | |
| | | 12 | 13 | 14 | 15 | 16 | 17 | 18 | 19 | 20 | 21 | 22 | 23 | 24 |
| Amounts of materials | Rubbery polymer (parts by weight) | 9.0 | 13.5 | 9.0 | 13.5 | 9.0 | 9.0 | 9.0 | 13.5 | 9.0 | 9.0 | 9.0 | 9.0 | 15.3 |
| | Styrene (parts by weight) | 81.0 | 57.4 | 81.0 | 57.4 | 81.0 | 81.0 | 81.0 | 57.4 | 81.0 | 81.0 | 81.0 | 81.0 | 57.4 |
| | Acrylonitrile (parts by weight) | — | 19.1 | — | 19.1 | — | — | — | 19.1 | — | — | — | — | 19.1 |
| | Methyl methacrylate (parts by weight) | — | — | — | — | — | — | — | — | — | — | — | — | — |
| | Ethylbenzene (parts by weight) | 10.0 | 10.0 | 10.0 | 10.0 | 10.0 | 10.0 | 10.0 | 10.0 | 10.0 | 10.0 | 10.0 | 10.0 | 10.0 |
| Reaction condition | Revolutions per minute (rpm) | 50 | 10.0 | 50 | 100 | 50 | 50 | 50 | 100 | 50 | 100 | 50 | 50 | 100 |
| Resin structure | Rubber content (%) | 10 | 15 | 10 | 15 | 10 | 10 | 10 | 15 | 10 | 10 | 10 | 10 | 15 |
| | Average diameter of rubber particles (μm) | 0.6 | 0.6 | 1.1 | 0.5 | 0.8 | 0.9 | 0.5 | 0.6 | 1.1 | 0.9 | 0.9 | 0.3 | 0.6 |
| Properties of resin composition | Izod impact strength (kg · cm/cm, measured using a notched test specimen) | 7 | 24 | 10 | 23 | 9 | 9 | 7 | 24 | 10 | 9 | 9 | 5 | 23 |
| | Luster (%) | 94 | 91 | 91 | 93 | 94 | 93 | 95 | 91 | 90 | 91 | 92 | 98 | 90 |

TABLE 8

| | Example No. | | | |
|---|---|---|---|---|
| | 53 | 54 | 55 | 56 |
| Rubbery polymer Sample No. | 25 | 26 | 27 | 28 |
| Amounts of materials | | | | |
| Rubbery polymer (parts by weight) | 9.0 | 9.0 | 9.0 | 9.0 |
| Styrene (parts by weight) | 81.0 | 37.0 | 81.0 | 81.0 |
| Acrylonitrile (parts by weight) | — | — | — | — |
| Methyl methacrylate (parts by weight) | — | 44.0 | — | — |
| Ethylbenzene (parts by weight) | 10.0 | 10.0 | 10.0 | 10.0 |
| Reaction condition | | | | |
| Revolutions per minute (rpm) | 50 | 50 | 50 | 50 |

TABLE 8-continued

| | Example No. | | | |
|---|---|---|---|---|
| | 53 | 54 | 55 | 56 |
| Rubbery polymer Sample No. | 25 | 26 | 27 | 28 |
| Resin structure | | | | |
| Rubber content (%) | 10 | 10 | 10 | 10 |
| Average diameter of rubber particles ($\mu$m) | 0.4 | 0.9 | 1.1 | 1.1 |
| Properties of resin composition | | | | |
| Izod impact strength (kg · cm/cm, measured using a notched test specimen) | 6 | 9 | 9 | 10 |
| Luster (%) | 97 | 92 | 90 | 90 |

TABLE 9

| | | Example No. | | | | | | | | | | |
|---|---|---|---|---|---|---|---|---|---|---|---|---|
| | | 57 | 58 | 59 | 60 | 61 | 62 | 63 | 64 | 65 | 66 | 67 |
| | | Rubbery polymer Sample No. | | | | | | | | | | |
| | | 29 | 30 | 31 | 32 | 33 | 34 | 35 | 36 | 37 | 38 | 39 |
| Amounts of materials | Rubbery polymer (parts by weight) | 13.5 | 9.0 | 9.0 | 13.5 | 13.5 | 9.0 | 9.0 | 9.0 | 9.0 | 9.0 | 9.0 |
| | Styrene (parts by weight) | 57.4 | 81.0 | 81.0 | 57.4 | 57.4 | 81.0 | 81.0 | 37.0 | 81.0 | 81.0 | 81.0 |
| | Acrylonitrile (parts by weight) | 19.1 | — | — | 19.1 | 19.1 | — | — | — | — | — | — |
| | Methyl methacrylate (parts by weight) | — | — | — | — | — | — | — | 44.0 | — | — | — |
| | Ethylbenzene (parts by weight) | 15.0 | 10.0 | 10.0 | 15.0 | 15.0 | 10.0 | 10.0 | 10.0 | 10.0 | 10.0 | 10.0 |
| Reduction condition | Revolutions per minute (rpm) | 100 | 50 | 50 | 100 | 100 | 50 | 50 | 50 | 50 | 50 | 50 |
| Resin structure | Rubber content (%) | 15 | 10 | 10 | 15 | 15 | 10 | 10 | 10 | 10 | 10 | 10 |
| | Average diameter of rubber particles ($\mu$m) | 0.5 | 1.0 | 1.2 | 0.6 | 0.7 | 0.8 | 0.9 | 1.0 | 1.3 | 1.0 | 1.0 |
| Properties of resin composition | Izod impact strength (kg. cm/cm, measured using a notched test specimen) | 23 | 10 | 10 | 8 | 24 | 9 | 9 | 10 | 11 | 9 | 9 |
| | Luster (%) | 94 | 87 | 86 | 91 | 92 | 90 | 88 | 87 | 86 | 88 | 88 |

TABLE 10

| Comparative Example No. | 6 | 7 | 8 | 9 | 10 | 11 | 12 | 13 |
|---|---|---|---|---|---|---|---|---|
| Rubbery polymer sample No. | ① | ② | ③ | ④ | ⑤ | ⑥ | ⑦ | ⑧ |
| Amounts of materials | | | | | | | | |
| Cyclohexane (g) | 5,000 | 5,000 | 5,000 | 5,000 | 5,000 | 5,000 | 5,000 | 5,000 |
| Tetrahydrofuran (g) | 1.2 | 1.2 | 1.2 | 1.2 | 1.2 | 1.2 | 1.2 | 1.2 |
| 1,3-Butadiene (g) | 595 | 588 | 665 | 644 | 700 | 700 | 700 | 700 |
| Styrene (g) | 105 | 112 | 35 | 56 | — | — | — | — |
| Organolithium catalyst | L | M | N | O | M | L | N | O |
| Amount of catalyst*1 (g) | 0.87 | 0.60 | 0.57 | 0.60 | 0.59 | 0.77 | 0.55 | 0.61 |
| Properties and characteristics of rubbery polymer | | | | | | | | |
| $\overline{M}w$ | 207,000 | 303,000 | 372,000 | 295,000 | 362,000 | 315,000 | 452,000 | 275,000 |
| Bound styrene*4 content (% by weight) | 15 | 16 | 5 | 8 | — | — | — | — |
| Block styrene*5 content (% by weight) | 14 | 14 | 4 | 7 | — | — | — | — |
| Block styrene ratio (%)*2 | 93 | 88 | 80 | 88 | — | — | — | — |
| Microstructure {1,2-vinyl content (%)} | 17 | 16 | 14 | 14 | 20 | 19 | 17 | 20 |
| Content (% by weight) of ≧ Mwp × 2*3 | 32 | 19 | 13 | 21 | 20 | 31 | 13 | 21 |
| $\overline{M}w/\overline{M}n$ | 2.2 | 1.1 | 1.3 | 1.2 | 2.3 | 1.1 | 1.3 | 1.3 |

*1The weight (g) of the organolithium catalyst is shown in terms of the weight (g) of n-butyllithium used in the production of a styrene-butadiene block copolymer.

*2Block styrene ratio (%) = $\frac{\text{Block aromatic vinyl monomer content}}{\text{Bound aromatic vinyl monomer content}} \times 100$

*3The content of a moiety of the rubbery polymer which has a molecular weight two or more times a weight average molecular weight corresponding to the peak top of the chromatogram of the rubbery polymer.
*4Bound aromatic vinyl monomer content
*5Block aromatic vinyl monomer content

TABLE 11

| | | Comparative Example No. | | | | | | | |
|---|---|---|---|---|---|---|---|---|---|
| | | 14 | 15 | 16 | 17 | 18 | 19 | 20 | 21 |
| | | Sample No. | | | | | | | |
| | | ① | ② | ③ | ④ | ⑤ | ⑥ | ⑦ | ⑧ |
| Amounts of materials | Rubber (parts by weight) | 9.0 | 9.0 | 9.0 | 9.0 | 9.0 | 9.0 | 9.0 | 9.0 |
| | Styrene (parts by weight) | 81.0 | 81.0 | 81.0 | 81.0 | 81.0 | 81.0 | 81.0 | 81.0 |
| | Ethylbenzene (parts by weight) | 10.0 | 10.0 | 10.0 | 10.0 | 10.0 | 10.0 | 10.0 | 10.0 |
| Reaction condition | Revolutions per minute (rpm) | 50 | 50 | 50 | 50 | 50 | 50 | 50 | 50 |
| Resin structure | Rubber content (%) | 10 | 10 | 10 | 10 | 10 | 10 | 10 | 10 |
| | Average diameter of rubber particles (μm) | 1.2 | 1.4 | 1.3 | 1.3 | 1.9 | 1.5 | 0.9 | 1.2 |
| Properties of resin composition | Izod impact strength (kg·cm/cm, measured using a notched test specimen) | 6 | 7 | 7 | 6 | 11 | 10 | 8 | 9 |
| | Luster (%) | 86 | 85 | 86 | 86 | 76 | 77 | 81 | 79 |

INDUSTRIAL APPLICABILITY

The rubbery polymer of the present invention is commercially advantageous in that, by using it as a reinforcing agent for a styrene polymer resin, there can be obtained a high impact styrene polymer resin composition which is useful for producing shaped articles having an excellent balance of impact resistance and appearance (luster). Examples of shaped articles which can be produced from this high impact styrene polymer resin composition include housings and other parts for household electric appliances, automobile parts, parts for office equipment, general sundry goods, footgear, toys and various industrial materials. The rubbery polymer of the present invention is also advantageous in that it is useful as an asphalt modifying agent for improving the properties of an asphalt to be used in, for example, road paving, production of a waterproof sheet and roofing.

What is claimed is:
1. A rubbery polymer comprising:
   (A) a conjugated diene polymer and, bonded thereto,
   (B) a lithium-detached residue of a lithium-containing organic polymer used as a catalyst in the production of said conjugated diene polymer, said residue comprising a polymer chain comprising monomer units (a) derived from at least one conjugated diene monomer and monomer units (b) derived from at least one aromatic vinyl compound, said monomer units (b) including monomer units derived from at least one multi-vinyl aromatic compound,
   wherein said lithium-containing organic polymer is obtained by a method comprising:
      providing a mixture of a first polymerizable material comprising at least one conjugated diene monomer and a second polymerizable material comprising at least one aromatic vinyl compound, said second polymerizable material containing at least one multi-vinyl aromatic compound having at least two vinyl groups, and
      adding an organolithium compound to said mixture of the first polymerizable material and the second polymerizable material, to thereby perform a reaction of the first polymerizable material and the second polymerizable material in the presence of said organolithium compound,
      wherein the content of said monomer units derived from at least one multi-vinyl aromatic compound in said lithium-containing organic polymer is from 6.2 to 40% by weight,
      the weight average molecular weight of said lithium-containing organic polymer is from 500 to 20,000, and
      said lithium-containing organic polymer has an Mw/Mn ratio of from 1.2 to 3.5 wherein Mw represents the weight average molecular weight of said lithium-containing organic polymer and Mn represents the number average molecular weight of said lithium-containing organic polymer.

2. The rubbery polymer according to claim 1, wherein said conjugated diene polymer (A) comprises (a') monomer units derived from at least one conjugated diene monomer.

3. The rubbery polymer according to claim 2, wherein said conjugated diene polymer (A) is comprised solely of said monomer units (a').

4. The rubbery polymer according to claim 1 or 2, wherein said conjugated diene polymer (A) comprises (a') monomer units derived from at least one conjugated diene monomer and (b') monomer units derived from at least one aromatic vinyl compound.

5. The rubbery polymer according to claim 4, wherein said conjugated diene polymer is a random copolymer comprised of said monomer units (a') and said monomer units (b').

6. The rubbery polymer according to claim 5, wherein the total amount of said monomer units (b) in said lithium-detached residue (B) and said monomer units (b') in said conjugated diene polymer (A) is 50% by weight or less, based on the weight of said rubbery polymer.

7. The rubbery polymer according to claim 4, wherein said conjugated diene polymer (A) is a block copolymer having a polymer block containing a first polymeric moiety comprised solely of said monomer units (b').

8. The rubbery polymer according to claim 7, wherein the total amount of said monomer units (b) in said lithium-detached residue (B) and said monomer units (b') in said conjugated diene polymer (A) is 50% by weight or less, based on the weight of said rubbery polymer, and wherein the amount of said monomer units (b') of said first polymeric moiety is less than 10% by weight, based on the total weight of said monomer units (b) in said lithium-detached residue (B) and said monomer units (b') in said conjugated diene polymer (A).

9. The rubbery polymer according to claim 8, which further comprises a second polymeric moiety comprised solely of said monomer units (b) in said lithium-detached residue (B), and wherein the total amount of said monomer units (b') of said first polymeric moiety and said monomer units (b) of said second polymeric moiety is 10% by weight or less, based on the total weight of said monomer units (b) in said lithium-detached residue (B) and said monomer units (b') in said conjugated diene polymer (A).

10. The rubbery polymer according to claim 3, which has the following properties:
    (1) 100,000 to 650,000 in terms of the weight average molecular weight,
    (2) 1.1 to 3.0 in terms of the ratio of the weight average molecular weight to the number average molecular weight, and
    (3) 20% by weight or less in terms of the content of a moiety of said rubbery polymer which has a molecular weight two or more times a weight average molecular weight corresponding to the peak top of the chromatogram of said rubbery polymer.

11. The rubbery polymer according to claim 7, which has the following properties:
    (1) 100,000 to 600,000 in terms of the weight average molecular weight,
    (2) 3 to 50% by weight in terms of the total content of said monomer units (b) and said monomer units (b'),
    (3) 10% by weight or more based on the total weight of said monomer units (b) in said lithium-detached residue (B) and said monomer units (b') in said conjugated diene polymer (A), in terms of the amount of said monomer units (b') of said first polymeric moiety,
    (4) 1.1 to 3.0 in terms of the ratio of the weight average molecular weight to the number average molecular weight, and
    (5) 20% by weight or less in terms of the content of a moiety of said rubbery polymer which has a molecular weight two or more times a weight average molecular weight corresponding to the peak top of the chromatogram of said rubbery polymer.

12. The rubbery polymer according to claim 11, which further comprises a second polymeric moiety comprised solely of said monomer units (b) in said lithium-detached residue (B), and wherein the total amount of said monomer units (b') of said first polymeric moiety and said monomer units (b) of said second polymeric moiety is more than 10% by weight, based on the total weight of said monomer units (b) in said lithium-detached residue (B) and said monomer units (b') in said conjugated diene polymer (A).

13. A catalyst comprising a lithium-containing organic polymer which is obtained by a method comprising:
    providing a mixture of a first polymerizable material comprising at least one conjugated diene monomer and a second polymerizable material comprising at least one aromatic vinyl compound, said second polymerizable material containing at least one multi-vinyl aromatic compound having at least two vinyl groups, and adding an organolithium compound to said mixture of the first polymerizable material and the second polymerizable material, to thereby perform a reaction of the first polymerizable material and the second polymerizable material in the presence of said organolithium compound, wherein the content of said at least one multi-vinyl aromatic compound in said lithium-containing organic polymer is from 6.2 to 40% by weight, the weight average molecular weight of said lithium-containing organic polymer is from 500 to 20,000, and said lithium-containing organic polymer has an Mw/Mn ratio of from 1.2 to 3.5 wherein Mw represents the weight average molecular weight of said lithium-containing organic polymer and Mn represents the number average molecular weight of said lithium-containing organic polymer.

14. A method for producing a rubbery polymer, which comprises polymerizing at least one conjugated diene monomer in the presence of a catalyst in a hydrocarbon solvent, said catalyst comprising a lithium-containing organic polymer which is obtained by a method comprising:

providing a mixture of a first polymerizable material comprising at least one conjugated diene monomer and a second polymerizable material comprising at least one aromatic vinyl compound, said second polymerizable material containing at least one multi-vinyl aromatic compound having at least two vinyl groups, and adding an organolithium compound to said mixture of the first polymerizable material and the second polymerizable material, to thereby perform a reaction of the first polymerizable material and the second polymerizable material in the presence of said organolithium compound, wherein the content of said at least one multi-vinyl aromatic compound in said lithium containing organic polymer is from 6.2 to 40% by weight, the weight average molecular weight of said lithium-containing organic polymer is from 500 to 20,000, and said lithium containing organic polymer has an Mw/Mn ratio of from 1.2 to 3.5 wherein Mw represents the weight average molecular weight of said lithium-containing organic polymer and Mn represents the number average molecular weight of said lithium-containing organic polymer, said rubbery polymer comprising a conjugated diene polymer having bonded thereto a lithium-detached residue of said lithium-containing organic polymer.

15. The method according to claim 14, wherein said at least one conjugated diene monomer is polymerized together with at least one aromatic vinyl compound.

16. A high impact styrene polymer resin composition which is obtained by a method comprising subjecting to polymerization:

(i) the rubbery polymer of claim 1, and (ii) a copolymerizable material selected from the group consisting of at least one aromatic vinyl compound and a mixture of at least one aromatic vinyl compound and at least one comonomer copolymerizable with said at least one aromatic vinyl compound, wherein said polymerization is selected from the group consisting of a bulk polymerization, a bulk-suspension polymerization and a solution polymerization.

17. The resin composition according to claim 16, wherein said copolymerizable material is a mixture of at least one aromatic vinyl compound and at least one unsaturated nitrile monomer.

18. The resin composition according to claim 16, wherein said copolymerizable material is a mixture of at least one aromatic vinyl compound and at least one monomer selected from the group consisting of an acrylic ester monomer and a methacrylic ester monomer.

* * * * *